(12) United States Patent
Thompson et al.

(10) Patent No.: US 10,474,953 B2
(45) Date of Patent: Nov. 12, 2019

(54) SYSTEMS AND METHODS FOR MULTI-OBJECTIVE OPTIMIZATIONS WITH DECISION VARIABLE PERTURBATIONS

(71) Applicant: THE AEROSPACE CORPORATION, El Segundo, CA (US)

(72) Inventors: Timothy Guy Thompson, Purcellville, VA (US); Matthew Phillip Ferringer, Round Hill, VA (US)

(73) Assignee: The Aerospace Corporation, El Segundo, CA (US)

( * ) Notice: Subject to any disclaimer, the term of this patent is extended or adjusted under 35 U.S.C. 154(b) by 577 days.

(21) Appl. No.: 15/268,840

(22) Filed: Sep. 19, 2016

(65) Prior Publication Data

US 2018/0082198 A1 Mar. 22, 2018

(51) Int. Cl.
*G06N 3/12* (2006.01)

(52) U.S. Cl.
CPC .................. *G06N 3/126* (2013.01)

(58) Field of Classification Search
CPC .................................................. G06N 3/126
See application file for complete search history.

(56) References Cited

U.S. PATENT DOCUMENTS

| | | |
|---|---|---|
| 5,255,345 A | 10/1993 | Shaefer |
| 5,319,781 A | 6/1994 | Syswerda |
| 5,568,500 A | 10/1996 | Furuya et al. |
| 6,532,076 B1 | 3/2003 | Sidorowich |

(Continued)

FOREIGN PATENT DOCUMENTS

WO WO2010132804 A1 11/2010

OTHER PUBLICATIONS

Ishibuchi, H., and T. Murata. 1998. "A Multi-Objective Genetic Local Search Algorithm and Its Application to Flowshop Scheduling." IEEE Transactions on Systems, Man and Cybernetics, Part C (Applications and Reviews) 28 (3): 392-403. https://doi.org/10.1109/5326.704576. (Year: 1998).*

(Continued)

*Primary Examiner* — Kamran Afshar
*Assistant Examiner* — Bahram Yousefi
(74) *Attorney, Agent, or Firm* — Lee & Hayes PC

(57) ABSTRACT

Systems and methods are provided for providing an optimized solution to a multi-objective problem. Potential solutions may be generated from parent solutions to be evaluated according to multiple objectives of the multi-objective problem. If the potential solutions are infeasible, the potential solutions may be perturbed according to a perturbation model to bring the potential solution to feasibility, or at least a reduced level of constraints. The perturbation models may include a weight vector that indicates the amount of perturbation, such as in a forward and/or reverse direction, of decision variables of the potential solutions. In some cases, the perturbation models may be predetermined. In other cases, the perturbation models may be learned, such as based on training constraint data. Additionally, potential solutions may be generated in a secondary optimization where a constraint based optimization may be performed to drive to generating a feasible solution for further evaluation according to objective values.

20 Claims, 10 Drawing Sheets

(56) References Cited

U.S. PATENT DOCUMENTS

| | | |
|---|---|---|
| 6,662,167 B1 | 12/2003 | Xiao |
| 6,941,287 B1 | 9/2005 | Vaidyanathan et al. |
| 7,835,929 B2 | 11/2010 | Bennett |
| 7,996,344 B1 | 8/2011 | Goel |
| 8,069,127 B2 | 11/2011 | Taylor et al. |
| 8,255,344 B2 | 8/2012 | Ferringer et al. |
| 8,255,345 B2 | 8/2012 | Ferringer et al. |
| 8,285,653 B2 | 10/2012 | Ferringer et al. |
| 8,433,662 B2 | 4/2013 | Ferringer et al. |
| 8,494,988 B2 | 7/2013 | Ferringer et al. |
| 8,498,952 B2 | 7/2013 | Ferringer et al. |
| 8,504,496 B2 | 8/2013 | Ferringer et al. |
| 8,560,472 B2 | 10/2013 | Ferringer et al. |
| 8,862,627 B2 | 10/2014 | Ferringer et al. |
| 9,189,733 B2 | 11/2015 | Thompson et al. |
| 9,321,544 B2 | 4/2016 | Thompson et al. |
| 2002/0013776 A1 | 1/2002 | Kishi |
| 2005/0187846 A1 | 8/2005 | Subbu et al. |
| 2007/0005522 A1 | 1/2007 | Wren |
| 2008/0010044 A1 | 1/2008 | Ruetsch |
| 2008/0094250 A1 | 4/2008 | Myr |
| 2008/0215512 A1 | 9/2008 | Narzisi et al. |
| 2008/0234944 A1 | 9/2008 | Schaffer et al. |
| 2008/0241839 A1 | 10/2008 | Potkin et al. |
| 2009/0313191 A1 | 12/2009 | Yao et al. |
| 2010/0040281 A1 | 2/2010 | Chen et al. |
| 2010/0046806 A1 | 2/2010 | Baughman et al. |
| 2010/0292929 A1 | 11/2010 | Ferringer et al. |
| 2010/0293120 A1 | 11/2010 | Ferringer et al. |
| 2010/0293122 A1 | 11/2010 | Ferringer et al. |
| 2010/0293313 A1* | 11/2010 | Ferringer ............... G06N 3/086 710/110 |
| 2011/0078100 A1 | 3/2011 | Goel |
| 2011/0231320 A1 | 9/2011 | Irving |
| 2011/0276527 A1 | 11/2011 | Pitcher et al. |
| 2012/0029965 A1 | 2/2012 | Steffen et al. |
| 2012/0063590 A1 | 3/2012 | Dortschy et al. |
| 2012/0084314 A1 | 4/2012 | Ferringer et al. |
| 2013/0024395 A1 | 1/2013 | Clark et al. |
| 2013/0054045 A1 | 2/2013 | Ramezani et al. |
| 2013/0132042 A1 | 5/2013 | Chan |
| 2013/0218526 A1 | 8/2013 | Lev et al. |
| 2014/0278695 A1 | 9/2014 | Smith et al. |
| 2015/0161629 A1 | 6/2015 | Verma |
| 2017/0011292 A1 | 1/2017 | Thompson |
| 2017/0068890 A1 | 3/2017 | Thompson |
| 2017/0169353 A1 | 6/2017 | Thompson et al. |
| 2017/0293839 A1 | 10/2017 | Thompson et al. |
| 2017/0364812 A1 | 12/2017 | Thompson et al. |
| 2018/0082198 A1* | 3/2018 | Thompson ............. G06N 3/126 |
| 2018/0082209 A1 | 3/2018 | Thompson |

OTHER PUBLICATIONS

Farmani, R., and J.A. Wright. 2003. "Self-Adaptive Fitness Formulation for Constrained Optimization." IEEE Transactions on Evolutionary Computation 7 (5): 445-55. https://doi.org/10.1109/TEVC.2003.817236. (Year: 2003).*

Chootinan, Piya, and Anthony Chen. 2006. "Constraint Handling in Genetic Algorithms Using a Gradient-Based Repair Method." Computers & Operations Research 33 (8): 2263-81. https://doi.org/10.1016/j.cor.2005.02.002. (Year: 2006).*

Dauphin, Yann N, Razvan Pascanu, Caglar Gulcehre, Kyunghyun Cho, Surya Ganguli, and Yoshua Bengio. 2014. "Identifying and Attacking the Saddle Point Problem in High-Dimensional Non-Convex Optimization." In Advances in Neural Information Processing Systems 27. (Year: 2014).*

Abraham, Andrew, "Particle Swarm Optimization of Low-Thrust, Geocentric-to-Halo-Orbit Transfers," May 2014, Thesis and Dissertation, Lehigh University, 202 pages.

Anonymous, <http://www.apptimation.com/Technology/Technology.html>, https://web.archive.org/web/20100701034104/http://www.apptimation.com/Technology/Technology.html, captured Jul. 1, 2010, 1 page.

Barker, Allison, "Aerospace Competes in International Global Trajectory Optimization Competition." Orbiter. vol. 48, No. 3. Mar. 27, 2008, 1 page.

Benedict et al., "Scheduling of Scientific Workflows Using Niched Pareto GA for Grids"; 2006, IEEE pp. 908-912.

Cantu-Paz, et al.; "Efficient parallel genetic algorithms: theory and practice." 2000; Comput. Methods Appl. Mech. Engrg. 186 (2000) pp. 221-238; Elsevier Science S.A.

Chuang, et al.; "An Extensible Genetic Algorithm Framework for Problem Solving in a Common Environment"; 2000; IEEE; Transactions on Power Systems, vol. 15, No. 1; pp. 269-275.

Deb et al., "A Fast and Elitist Multi-Objective Genetic Algorithm: NSGA-11" Sep. 2000, KanGAL Report No. 200001. 20 pages.

Deb et al., "Evaluating the epsilon-Domination Based Multi-Objective Evolutionary Algorithm for a Quick Computation of Pareto-Optimal Solutions." 2005, Evolutionary Computation (13)4: 501-525.

Deb et al.; "Omni-Optimizer: A generic evolutionary algorithm for single and multi-objective optimization"; 2006; Elsevier; European Journal of Operational Research 185 (2008); pp. 1062-1087.

Erickson et al.; Multi-objective Optimal Design of Groundwater Remediation Systems: Application of the Niced Pareto Genetic Algorithm (NPGA); Advances in Water Resources 25 (2002); pp. 51-65.

Ferringer et al.. "Efficient and Accurate Evolutionary Multi-Objective Optimization Paradigms for Satellite Constellation Design." Journal of Spacecraft and Rockets. vol. 44. No. 3, May-Jun. 2007. 682-691.

Ferringer, Matthew P. "General Framework for the Reconfiguration of Satellite Constellations." 2009, Dissertation, The Pennsylvania State University, Available at <http://etda.libraries. psu.edu/lheses/approved/WorldWideIndex/ETD-3537/index.html>, 40 pages.

Ferringer et al.; "Many-objective Reconfiguration of Operational Satellite Constellations with the Large-Cluster Epsilon Non-dominated Sorting Genetic Algorithm-11." 2009 IEEE Congress on Evolutionary Computation, 10 pages.

Ferringer et al., "Pareto-hypervolumes for the Reconfiguration of Satellite Constellations." AIAA/AAS Aslrodynamics Specialist Conference and Exhibit. Aug. 18-21, 2008, p. 1-31.

Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.

Hadka et al., "Borg: An Auto-Adaptive Many-Objective Evolutionary Computing Framework," 2013. Evolutionary Computation, 21(2): 231-259.

Horn et al.; "A Niched Pareto Genetic Algorithm for Multiobjective Optimization" 1994; IEEE; pp. 82-87.

Search Report and Written Opinion for International Application No. PCT/US2010/034955 dated Aug. 17, 2010.

Kollat et al., "A Computational Scaling Analysis of Multiobjective Evolutionary Algorithms in Long-Term Groundwater Monitoring Applications." Advances in Water Resources. Jan. 25, 2006. 1-24.

Kollat et al., "A Framework for Visually Interactive Decision-making and Design using Evolutionary Multi- objective Optimization (VIDEO)" Environmental Modelling & Software 22. 2007, 1691-1704.

Kollat et al., "A New Epsilon-Dominance Hierarchical Bayesian Optimization Algorithm for Large Multiobjective Monitoring Network Design Problems" Advances in Water Resources 31. 2008, 828-845.

Kollat et al., "Comparing state-of-the-art evolutionary multi-objective algorithms for long-term groundwater monitoring design." Advances in Water Resources 29 (2006): 792-807. <www.elsevier.com/locate/advwatres>.

Kollat et al., "The Value of Online Adaptive Search: A Performance Comparison of NSGAII, epsilon-NSGAII and epsilonMOEA." Springer-Verlag Berlin Heidelberg 2005. 386-398.

Laumanns et al.; "Combining Convergence and Diversity in Evolutionary Multi-Objective Optimization"; 2002; Massachusetts Institiute of Technology; Evolutionary Computation 10(3); pp. 1-21.

(56) References Cited

OTHER PUBLICATIONS

Lorenz, Edward, "Predictability: A Problem Partly Solved," 1996, In Proc. Seminar on Predictability, vol. 1, No. 1, 18 pages.
Mackey et al, "Oscillation and Chaos in Physiological Control Systems," Jul. 15, 2977, Science. 197(4300): 287-289.
Muhlenbein et al.; "Evolution in time and space -the parallel genetic algorithm."; 1991; Morgan Kaufmann; pp. 1-22.
Office Action for U.S. Appl. No. 13/837,782, dated Jan. 15, 2015, Smith et al., "Systems and Methods for Prioritizing Funding of Projects", 21 pages.
Office Action for U.S. Appl. No. 13/837,782, dated Oct. 20, 2016, Smith et al., "Systems and Methods for Prioritizing Funding of Projects", 16 pages.
Office Action for U.S. Appl. No. 13/837,782, dated Mar. 30, 2017, Smith et al., "Systems and Methods for Prioritizing Funding of Projects", 20 pages.
Office Action for U.S. Appl. No. 13/837,782, dated Apr. 7, 2016, Smith et al., "Systems and Methods for Prioritizing Funding of Projects", 14 pages.
Office action for U.S. Appl. No. 14/796,299, dated Jun. 19, 2018, Thompson, "Systems and Methods for Multi Objective Evolutionary Algorithms with Category Discovery", 22 pages.
Office action for U.S. Appl. No. 14/847,424, dated Jun. 28, 2018, Thompson, "Systems and Methods for Multi Objective Optimizations with Live Updates", 24 pages.
Reed et al. "Parallel Evolutionary Multi-Objective Optimization on Large. Heterogeneous Clusters: An Applications Perspective." Journal of Aerospace Computing Information and Communication. vol. 5. Nov. 2008, 460-478.
Srinivas et al., "Multiobjective Optimization Using Nondominated Sorting in Genetic Algorithms," 1994. Evolutionary Computation, 2(3): 221-248.
Stodgell et al., "Satellite Rendezvous Tours Using Multiobjective Evolutionary Optimization."Astrodynamics 2007: Advances in teh Astronautical Sciences, vol. 129, Part III, Proceedings of the AAS/AIAA Astrodynamics Specialist Conference, Aug. 19-23, 2007, Mackinac Island, Michigan, pp. 2069-2094, 28 pages.
Subbu, et. al., "Management of Complex Dynamic Systems based on Model-Predictive Mutli-objective Optimization", IEEE International Conference on Computational Intelligence for Measurement Systems and Applications, Jul. 2006, pages.
Tan et al.; "A Multiobjective Evolutionary Algorithm Toolbox for Computer-Aided Multiobjective Optimization"; 2001; IEEE; Transactions on Systems, Man, and Cybernetics- Part B: Cybernetics, vol. 31, No. 4; pp. 537-556.
Tang, Yong, "Advancing Hydrologic Model Evaluation and Identification Using Multiobjective Calibration Sensitivity Analysis and Parallel Computation." ProQuest Information and Learning Company. 2007, 48 pages.
Tang et al., "Parallelization Strategies for Rapid and Robust Evolutionary Multiobjective Optimization in Water Resources Applications." Advances in Water Resources. 2006, 1-39.
Van Veldhuizen et al., "Considerations in Engineering Parallel Multiobjective Evolutionary Algorithms." IEEE Transactions on Evolutionary Computation. vol. 7, No. 2, Apr. 2003. 144-173.
Van Veldhuizen et al., "(Final Draft) TR-98-03 Multiobjective Evolutionary Algorithm Research: A History and Analysis" Oct. 14, 1998; pp. 1-30.
Ventura et al.; "JCLEC: a Java framework for evolutionary computation"; 2007; Springer-Verlag; pp. 381-392.
Zimmer et al., "Utilizing Evolutionary Algorithms for Problems with Vast Infeasible Regions and Expensive Function Evaluations." The Aerospace Corporation. Jun. 27, 2008, 12 pages.
Office Action for U.S. Appl. No. 14/963,870, dated Oct. 3, 2018, Thompson et al, "Systems and Methods for Muiti-Objective Evolutionary Algorithms with Soft Constraints", 28 pages.
Office Action for U.S. Appl. No. 15/094,521, dated Nov. 29, 2018, Thompson et al, "Systems and Methods for Multi-Objective Heuristics with Conditional Genes", 26 pages.
Kukkonen et al, "Ranking-Dominance and Many-Objective Optimization," Sep. 25, 2007, IEEE Congress on Evolutionary Computation, pp. 3983-3990.
Office Action for U.S. Appl. No. 14/796,299 dated Jan. 23, 2019, Thompson et al., "Systems and Methods for Multi-Objective Evolutionary Algorithms with Category Discovery," 15 pages.
Office Action for U.S. Appl. No. 15/267,528, dated Apr. 16, 2019, Timothy Guy Thompson, "Systems and Methods for Multi-Objective Optimizations with Objective Space Mapping", 25 pages.
Office Action for U.S. Appl. No. 14/847,424, dated Apr. 19, 2019, Timothy Guy Thompson, "Systems and Methods for Multi-Objective Optimizations with Live Updates", 19 pages.
Patel et al., "Fast Mesh-Sorting in Multi-objective Optimization," 2015, Int'l Federation of Automatic Control (IFAC-PapersOnLine) 48(8), pp. 936-941.
Sorensen, "Route stability in vehicle routing decisions: a bi-objective approach using metaheuristics", European Central Journal of Operations Research, 2006, pp. 193-207.

\* cited by examiner

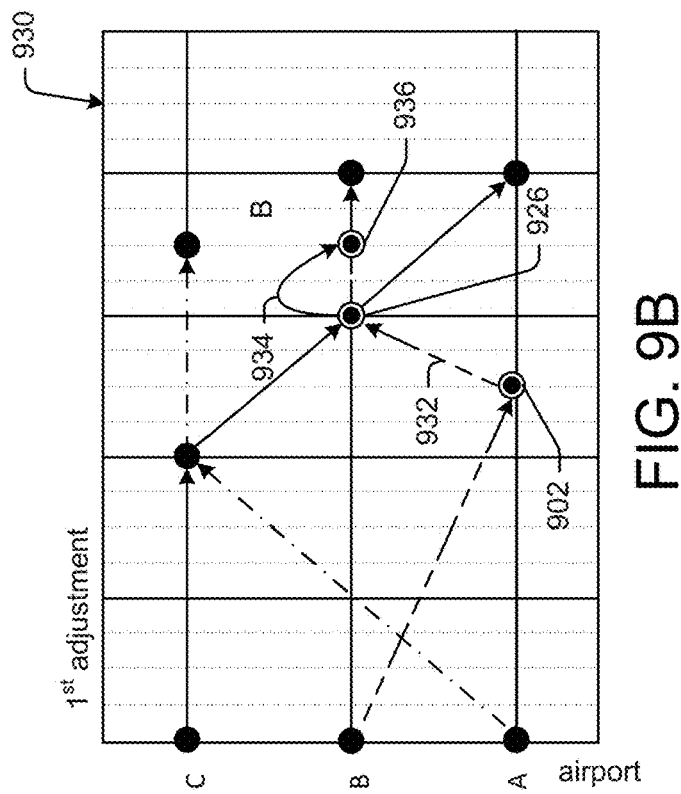
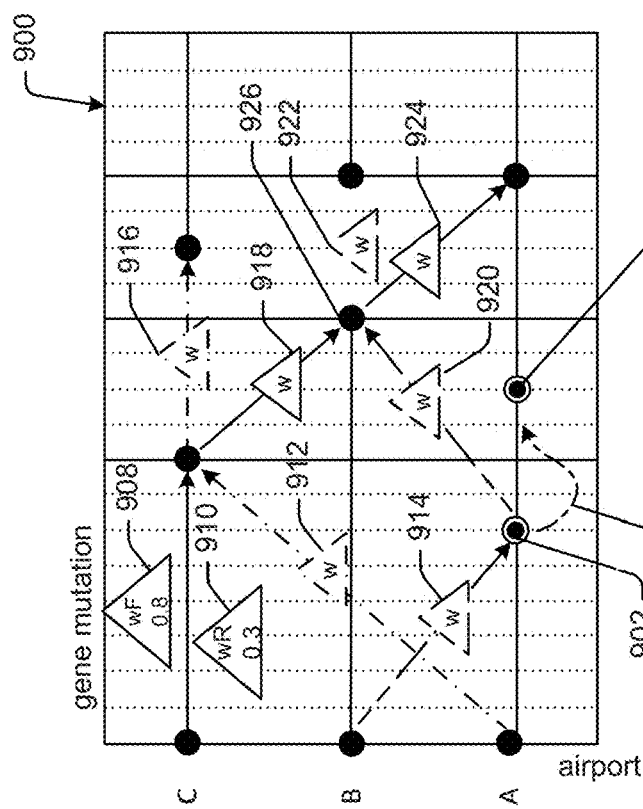
FIG. 9B
FIG. 9A

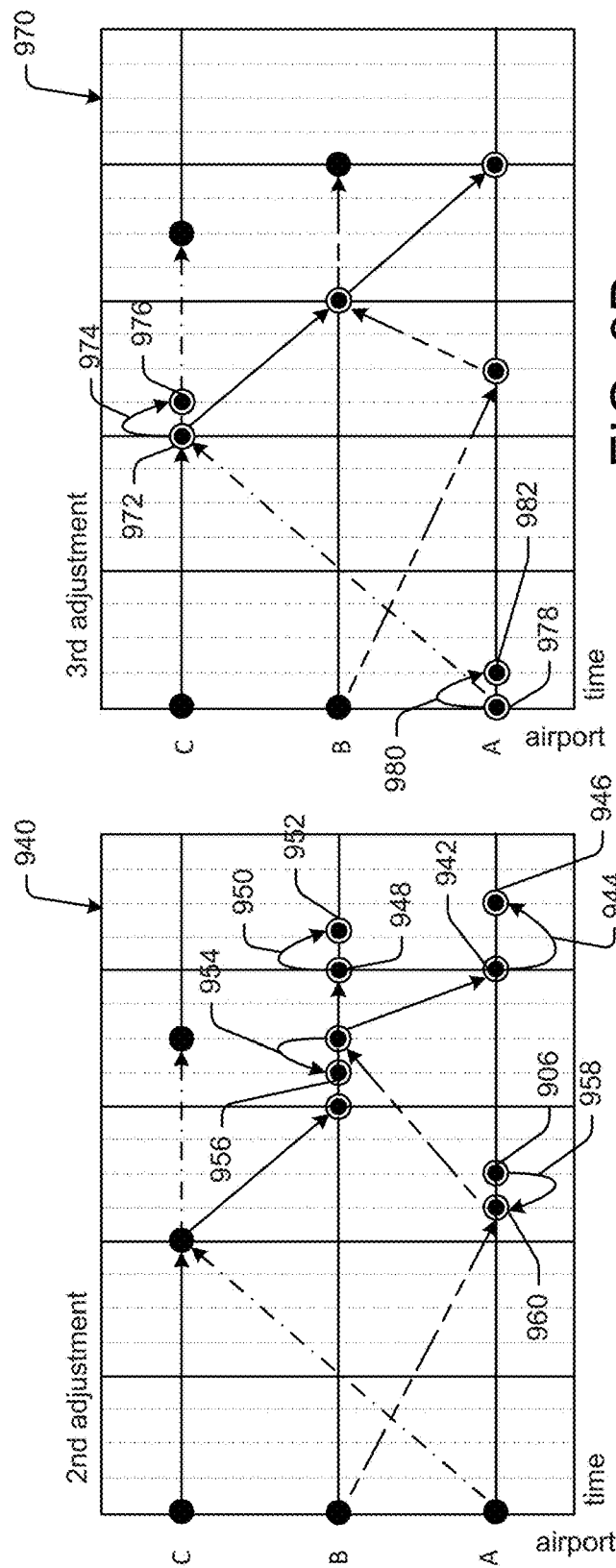

SYSTEMS AND METHODS FOR MULTI-OBJECTIVE OPTIMIZATIONS WITH DECISION VARIABLE PERTURBATIONS

FIELD OF THE DISCLOSURE

Aspects of the disclosure are related generally to multi-objective optimizations, and more particularly to systems and methods for decision variable perturbations.

BACKGROUND OF THE DISCLOSURE

Large-scale value-based non-linear models often require large numbers of decision variables and constraints (e.g., over a million). Heuristic systems, such as Multi-Objective Optimization Algorithms (MOOA), may be particularly useful in optimizing problems with large number of interdependent variables. Often times, the problems being optimized have a relatively large number of constraints. In these relatively constrained problems, it may be difficult to arrive at an optimized solution.

BRIEF DESCRIPTION OF THE DRAWINGS

Reference will now be made to the accompanying drawings, which are not necessarily drawn to scale, and wherein:

FIGS. 9A-D are schematic diagrams that illustrate example cascading perturbations of a series of linked genes within a chromosome in response to a value setting of a particular gene, in accordance with example embodiments of the disclosure.

DETAILED DESCRIPTION

Figure 1:
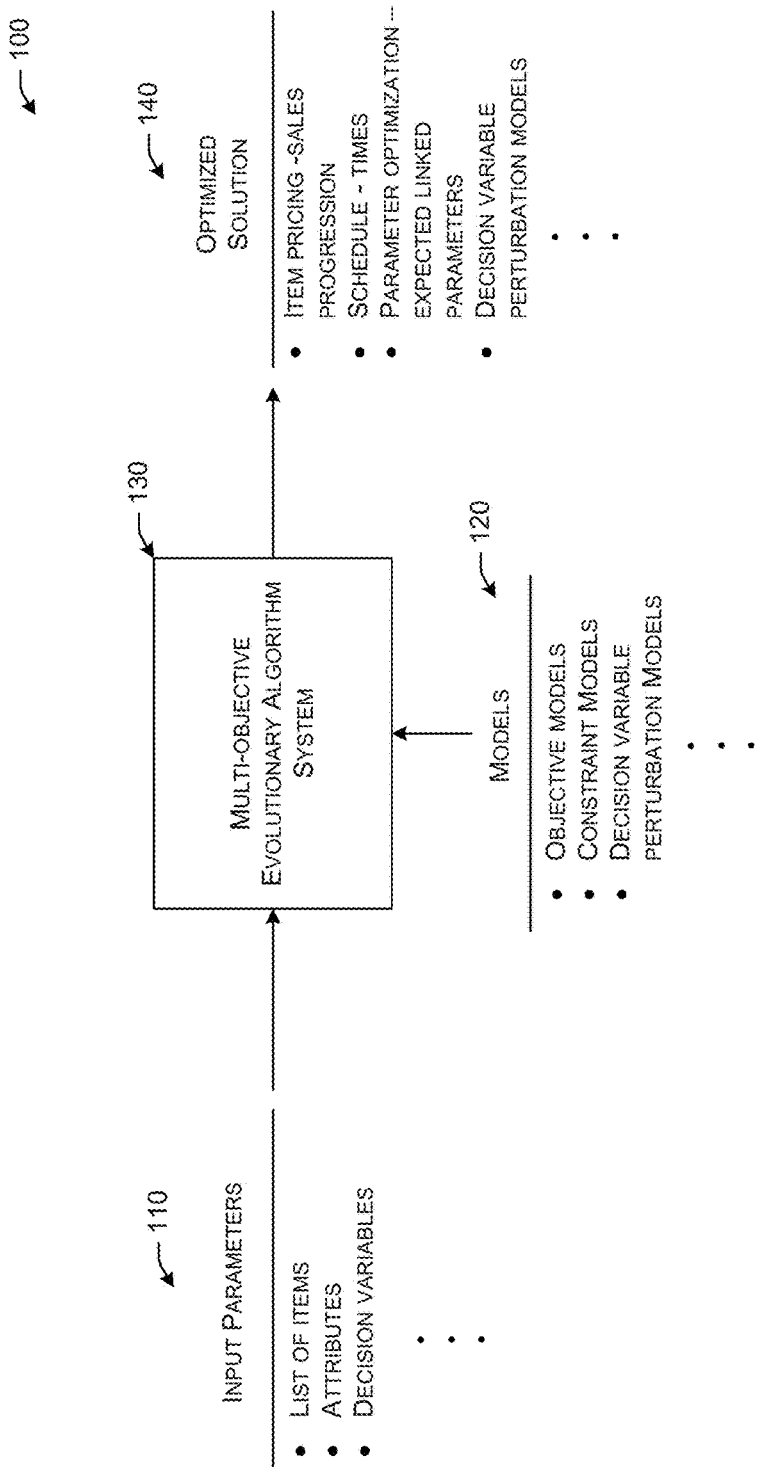
FIG. 1 is a schematic diagram that illustrates an example optimizing system with input parameters and optimized solutions based on one or more objective models and/or constraint models of a multi-objective optimization algorithm (MOOA) system with decision variable perturbation, in accordance with example embodiments of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Example embodiments of the disclosure may include a multi-objective optimization system having a multi-objective optimization algorithms (MOOAs) system that may perform decision variable perturbations and/or decision variable cascading. Evolutionary algorithms have been described in a variety of other publications including commonly owned U.S. patent application Ser. No. 12/550,858, filed on May 12, 2010 and titled "Systems and Methods for Generating Feasible Solutions form Two Parents for an Evolutionary Process," the contents of which, in its entirety, is incorporated herein by reference.

In example embodiments, a multi-objective optimization may be performed by the MOOA system employing decision variable perturbations, prior to implementation of the optimized solution. Such an initial optimization may be performed for any suitable variety of applications and/or performed to optimize any suitable variety of objectives. An optimized solution may be one where the solution is non-dominated relative to other potential solutions. A non-dominated solution may be a solution where the solution performs no worse than another solution, when evaluated according to all of the objectives for that particular optimization, while performing better than all other solutions according to at least one of the objectives. When an initial multi-objective optimization is generated, the stakeholder (e.g., the entity requesting/using the optimization) may attempt to implement the optimized initial optimization. The optimized solution, therefore, may also be a solution that is feasible, or otherwise physically implementable.

In example embodiments, the MOOA system may be configured to provide optimized solutions for optimization problems having a relatively high number and/or levels of constraints. Some of the constraints, in example embodiments, may include a constraint imposed on one decision variable (e.g., the variables being optimized in the optimization problem) by another decision variable. In other words, the decision variables, represented as genes in a chromosome data structure, may have linkages therebetween that may lead to constraint violations. As a non-limiting example, consider an airline schedule optimization problem where there are a series of line-of-flights (LOF), or otherwise the use of the same aircraft for onward travel. An example of a LOF may be when a single aircraft is used to fly from Los Angeles (LAX) to Atlanta (ATL) to Washington D.C. (IAD), and back to Los Angeles in a day. It can be seen that if the fight schedules were to be optimized for any variety of objectives (e.g., profit, delays, customer satisfaction, etc.), there would be a variety of constraints that any optimized solution must adhere to. One of these constraints would be that the ATL to IAD flight cannot leave before the flight from LAX lands at ATL, the passengers are unloaded, the aircraft is cleaned, new passengers are loaded, the aircraft is optionally refueled, etc. Similarly, the IAD to LAX flight cannot take off at least until the flight form ATL arrives at IAD. It will be appreciated that when optimizing an airline schedule across a network of a major airline, there may be a relatively large number of constraints associated with the decision variables (e.g., departure times, arrival times, etc.).

In example embodiments, when optimizing a relatively highly-constrained problem, such as the aforementioned airline scheduling problem, there may be a relatively large number of constraint violations detected in potential solutions. As these constraint violations may restrict the number of chromosome solutions evaluated on its objective merits, the optimization may be relatively inefficient. A relatively large amount of compute resources and/or time may be spent on filtering out constraint violated potential solutions. In fact, in some cases, the constraint violation filtering burden may be so great that it may not be possible for the MOOA system to arrive at an optimized solution.

According to example embodiments of the disclosure, there may be a mechanism in the MOOA to drive to feasible chromosomes (e.g., chromosomes that do not violate any constraints). This mechanism may perturb one or more genes based at least in part on one or more other genes in a chromosome. By doing so, the chromosome may become feasible due to adequate repair of one or more of the genes by perturbation. The perturbation of the genes may be driven by a priori knowledge of linkages between decision variables in a chromosome, in some example embodiments. For example, in the airline flight scheduling problem, the amount of time between a certain departure time and a subsequent departure time may be known and coded as constraint elimination rules to be implemented when a constraint violation is detected. For example, suppose a constraint violation rule states that the ATL flight, from the previous flight scheduling example, cannot depart until 7 hours after the LAX flight departs. If it is found that in a particular chromosome there is only a 6 hour time difference between the two departure times, as encoded in the chromosome's genes, then one or more of the genes of the chromosome may be perturbed to remove the constraint violation. For example, the ATL flight may be pushed forward in time by an hour to achieve feasibility. Alternatively the LAX flight may be pushed back by an hour. As yet another non-limiting alternative, the ATL flight may be pushed forward by 30 minutes and the LAX flight may be pushed back by 30 minutes.

In some example embodiments, instead of having a priori knowledge and rules based thereon of all of the interdependencies of the genes of a chromosome, the interdependencies may be learned. This learning may be conducted in-situ and/or ex-situ from the optimization. Training sets of chromosomes may be used to determine the constraint topology of the optimization problem. The learning may be used to provide a mechanism to perturb genes of infeasible chromosomes to reduce and/or eliminate their constraints. In some cases, where the learning may be performed ex-situ, a set of training chromosomes may be used and applied to constraint models to identify perturbations that are to be performed to make the chromosomes unconstrained. In other cases, where the learning may be performed in-situ, the learning and topological models may be determined while one or more feasible chromosomes are generated. In example embodiments, feasible chromosomes to be evaluated are potential non-dominated solutions may be generated in a secondary optimization that uses constraint models and resulting magnitudes of constraints to drive to a feasible chromosome.

Regardless of whether the constraint minimization perturbation weights are predefined, learned in-situ, and/or learned ex-situ, the constraint perturbations may be described as a weight vector that provides a level of perturbation required to minimize any constraints in a chromosome. In example embodiments, the weight vectors may provide for a cascading type of modifications in gene values, where not only do genes get perturbed based on a single other gene, but in a manner where that perturbation may lead to further perturbation(s) of other genes. Indeed, particular genes may have a series of other genes that may influence the value of that particular gene. Consider, for example the previous non-limiting example with the flights from LAX to ATL to IAD to LAX. If a particular chromosome is generated for evaluation where the time between the LAX departure and the ATL departure results in a constraint violation, as determined by one or more constraint models, the ATL departure may be perturbed (e.g., moved to a later time). However, this may result in creating a constraint violation in a subsequent flight leg along the LOF, and thus may necessitate perturbing the IAD departure to LAX. In this way, it can be seen that a cascading set of perturbations may be triggered from an initial identified constraint violation.

In some example embodiments, the weight vectors (e.g., predetermined or learned) may be such that the perturbations may be performed in a reverse direction and/or both a forward and reverse direction. In other words, when a particular gene is identified as causing a constraint violation and a violation source gene is identified, the violation source gene may be perturbed to mitigate the constraint. As an example, consider the previously discussed non-limiting example situation with the flights from LAX to ATL to IAD to LAX. In example embodiments, the if a constraint violation is detected in the ATL departure time due to temporal proximity to the LAX departure time, according to example embodiments, a perturbation may be initiated in the LAX departure time by pushing the LAX flight departure earlier to remove the constraint violation with the ATL flight departure time. In other example embodiments, the both the LAX flight time may be perturbed to an earlier time and the ATL flight departure time may be perturbed to a later time to remove the constraint violation resulting from temporal proximity of the LAX and ATL departure times.

In example embodiments, during a multi-objective optimization, chromosomes may be selected for producing additional offspring chromosomes for multi-objective evaluation. These selected parent chromosomes may be chromosomes that were found to be non-dominated in a previous generation and/or starting point chromosomes. These parent chromosomes may then be applied to a secondary optimization to generate one or more feasible child chromosomes for evaluation based at least in part on objective-based performance. The secondary optimization may generate a population of prenatal chromosomes based on the parent chromosomes and then generate a population of child chromosomes by applying the population of prenatal chromosomes to a current weight vector. Next, according to example embodiments, the child chromosomes may be applied to one or more constraint models. The constraint models may provide information about the genes where constraint violations are detected, the genes upon which the constraint violations depend, and the magnitude of the constraint violations. In example embodiments, the constraint information (e.g., constraint violation gene, constraint source gene, constraint magnitude, etc.) may be used to train and/or revise the weight vector. As discussed above the weight vector may include indications of how much to perturb genes within infeasible chromosomes to bring the chromosomes into feasibility.

In example embodiments, the weight vectors may be determined based on any variety of modeling and/or learning mechanisms. Neural networks, linear regression, Bayesian tree models, genetic algorithms, combinations thereof, or the like. In example embodiments, the weight vector may include offsets that may be applied to one or more genes to remove any constraints resulting from and/at those genes. In further example embodiments, the weight vector may include multipliers that may be applied to one or more genes to remove any constraints resulting from and/or at that those genes. In still further example embodiments, the weight vector may include offsets and multipliers that may be applied to one or more genes to remove any constraints resulting from and/or at that those genes. In yet further example embodiments, the weight vector may include multipliers that may be applied to one or more intermediary nodes (e.g., such as in a neural network) and/or genes to remove any constraints resulting from and/or at that those genes. In some further example embodiments, the weight vector may include multipliers and/or offsets that may be applied to one or more genes in a forward direct and/or a reverse direction to remove any constraints resulting from and/or at that those genes.

In example embodiments, where a secondary optimization (e.g., constraint minimization) is implemented, the secondary optimization may be performed at a slave processor, where the slave processor may receive two or more parent chromosomes from a master processor. The secondary optimization may receive the parent chromosomes and generate a number of prenatal chromosomes therefrom by applying one or more genetic operators, such as cross-over and/or mutations. In a first iteration of the secondary optimization, the weight vector may be set to no weight (e.g., no perturbation of the prenatal chromosomes to attempt to generate less constrained child chromosomes). In the first iteration of the secondary optimization, the prenatal chromosomes are the same as child chromosomes, since the prenatal chromosomes are not perturbed. In subsequent iterations, where the weight vector is not set to no perturbation, child chromosomes may be determined from the prenatal chromosomes by applying the current weight vector to the prenatal chromosomes.

Continuing now with the first iteration, the child chromosomes (e.g., same as the prenatal chromosomes in the first iteration) may then be applied to the constraint models. The constraint models may then return the point of any constraint violation(s), the magnitude of each of the constraint violation(s), and/or the gene(s) upon which each of the constraint violation(s) are based. Consider the preceding non-limiting example where the LAX to ATL flight departure time may be 5 hours prior to the ATL to IAD departure time, but a time difference of 7 hours is needed to prevent a constraint violation. In this case, the constraint models may indicate that the gene for the ATL to IAD departure is the location of the constraint, the magnitude is by 2 hours, and the source of constraint is the LAX to ATL departure. Thus, the constraint models may provide relatively detailed information about the constraint violation that may be applied to a learning model to generate and/or revise the weight vector.

After information about constraints are received for each of the child chromosomes (e.g., same as prenatal chromosomes in a first iteration), in example embodiments, in addition to applying the information about constraints to a learning model, the constraint information may be used to non-domination sort (e.g., rank) each of the child chromosomes. The non-domination ranking may be performed according to any one of, or any combination of constraint information provided for the child chromosomes. For example, in some cases, the child chromosomes may be non-domination ranked by the number of constraints. In other example cases, the child chromosomes may be ranked according to a cumulative magnitude of constraints of those child chromosomes. In yet other example cases of the non-domination sorting of child chromosomes, both the number of the constraint violations and an average value of the magnitude of those constraints for each of the child chromosomes may be used to rank the child chromosomes. As in the case of objective space non-domination ranking, the constraint space non-domination ranking may be according to any suitable number of dimensions (e.g., hypervolumetric/hyperdimensional constraint space).

When the child chromosomes are non-domination ranked, it may be determined if there are any feasible child chromosomes. If there are any feasible child chromosomes, then the secondary optimization to find a feasible child chromosome may be terminated and any feasible child chromosome(s) may be returned to the primary optimization performing the multi-objective optimization. Additionally, in example embodiments, the weight vector for perturbing the chromosomes to be less constraint may be returned to the primary optimization. In some example embodiments, the secondary optimization may be performed at a slave processor, while the primary optimization may be performed at a master processor. Thus, when parents are selected at the master processor for the primary optimization, the parents may be sent to a slave processor for the secondary optimization to produce a feasible child and/or children chromosomes. In example embodiments, the master processor may select multiple sets (e.g., pairs) of parents and spawn multiple secondary constraint optimization procedures at multiple slave processors, such that multiple feasible chromosomes may be returned to the master processor for the purposes of multi-objective optimization. The slave processors may, in example embodiments, generate feasible child chromosomes in a synchronous or asynchronous manner and return any feasible child chromosomes to the master processor. In example embodiments, a secondary optimization at a particular slave processor may return more than one feasible child chromosome. The secondary constraints may also return a weight vector that may be implemented on chromosomes to perturb them to make the post-perturbation result less constrained, or even feasible (e.g., no constraints). In example embodiments, weight vectors from various secondary optimizations may be reconciled at the master processor. Thus, in example embodiments, the weight vectors may be continuously refined based on learning from the secondary optimizations.

Although the multi-objective problem has been described in the context of an airline scheduling problem, it will be appreciated that the multi-objective problem may be any suitable multi-objective problem and the systems and methods, as described herein, may be applied to any suitable subsequent multi-objective optimization. In example embodiments, the methods and systems, as described herein, may be suited for pricing optimization problems. In other example embodiments, the methods and systems, as described herein, may be suited for scheduling problems. In other example embodiments, the methods and systems, as described herein, may be suited for multi-parameter optimization. Indeed, in other example embodiments, the optimization problem to which the methods and systems described herein may be applied may be a combination of various elements, such as pricing, timing, or any other suitable parameter input. In example embodiments, the systems and methods, as described herein, may be applied to any optimization problem where interdependencies between decision variables may be exploited to drive potential solutions to feasibility prior to evaluating those solutions based on their objective performance. In example embodiments, the systems and methods, as described herein, may be applied to any optimization problem where perturbations to potential solutions may be learned and applied to reduce the number and/or magnitude of constraints of potential solutions.

In one non-limiting example, a multi-objective optimization may be for a schedule of flights, times, and routes within a network of an airline. In this case, the stakeholder may be the airline and the multiple objectives may be any variety of general or industry specific considerations, such as profitability, fuel consumption, ground time, load factor, equipment non-utilization time, customer satisfaction metrics, on-time departures, lost bags, on-time arrivals, accumulated delays, combinations thereof, or the like. While performing the initial optimization, one or more mesh chromosomes may be stored in a mesh archive along with their location within the objective space. When the airline receives an initial optimization, such as from the MOOA system, the airline may attempt to implement that initial optimization throughout their flight network. This may include attempting to implement and/or control such factors as departure times, fueling points of equipment, allocation of equipment to routes, ground time, equipment/route mapping to arrival and/or departure gates, equipment mapping to airports, idle equipment allocations and/or movement, back-up equipment allocation to airports, equipment to location inventory, combinations thereof, or the like. In example embodiments, the multi-objective optimization may be highly constrained with islands of feasibility in relatively vast infeasible space. In further example embodiments, the multi-objective problems may have decision variables (e.g., as represented by genes of chromosome data structures) that may be linked to other decision variables. In other words, constraints at any particular gene may be based upon, or limited by, the value of one or more other genes.

It will be appreciated that the systems and methods, as described herein, may be configured, in example embodiments, for any variety of suitable optimization problems, including the aforementioned scheduling problems. For example, scheduling problems may include optimizing the scheduling of various services associated with transportation, delivery courier, logistics, just-in-time manufacturing, combinations thereof, or the like. In such problems, items such as delivery times, arrival delays, non-deployed time, maintenance time, consumable usage, maintenance, revenues, costs, profits, return on capital (ROC), return on investments (ROI), combinations thereof, or the like may be optimized. Indeed, it will be appreciated that any type of scheduling problem may be applied to the systems and methods, as described herein. In example embodiments, such optimizations may include re-optimizations due to scheduling being prone to a variety of weather, emergency, and/or asset/infrastructure impairment related irregular operations. In some example embodiments, the systems and methods, as described herein, may be particularly suited for solving relatively highly-constrained multi-objective scheduling optimization problems. In example embodiments, the systems and methods, as described herein, may be used for efficiently evaluating feasible potential solutions to the multi-objective scheduling optimization problems relatively quickly by learning and using constraint dependencies between genes.

In another non-limiting example, the systems and methods, as described herein, may be applied to pricing problems, such as optimizing the pricing of various hotel rooms that may be available to a hotel or chain of hotels. The pricing may be optimized within the constraints of offering the hotel rooms for rental. In this example, each of the various types of rooms (queen bed/facing the beach, two double beds/facing the pool, etc.) may be represented as separate prices for rental. The prices of the hotel rooms may be determined based at least in part on expected demand of the hotel rooms at various rental prices. The initial optimization may provide a price for each room of a hotel chain for each rental day at some predetermined time in the future. These optimized variables may be provided and implemented, such as by offering the rooms for sale at the optimized prices, by the hotel chain operator. In addition to the pricing of rooms offered for sale across the network of the hotel chain (e.g., pricing by location, season, room type, room size, view, amenities, packages, etc.), the MOOA may provide an expected progression of sales as a function of the time until the rental date arrives.

It will be appreciated that the systems and methods, as described herein, may be configured, in example embodiments, for any variety of suitable optimization problems, including the aforementioned pricing optimization problems. For example, pricing problems may include optimizing the price of different types of hotel rooms for a hotel chain, different type of seats of various flights for an airline, different type of insurance products targeted to various insurance clients for an insurance company, different types of client services targeted to various investors of an investment firm, product pricing of various models and trims of cars manufactured and sold by car companies, or the like. Indeed, it will be appreciated that any type of pricing problem may be applied to the systems and methods, as described herein. In such pricing problems, items such as non-deployed time, cancelations, vacancies, overbooking, consumable usage, maintenance, revenues, costs, profits, return on capital (ROC), return on investments (ROI), combinations thereof, or the like may be optimized.

In another non-limiting example, a steel manufacturer may optimize a product mix for a particular factory to maximize a variety of financial objectives, such as revenue, profits, ROI, ROC, etc. The MOOA system may provide an optimized mix of various products (e.g., I-beams, hot rolled steel, cold rolled steel, rebar, etc.), by considering the aforementioned multiple objectives, that may be manufactured in the factory and predict yield and revenue from each of the products. If conditions assumed for the optimization change, then a reformulated re-optimization may be performed. In example embodiments, the decision variables may be linked and the linkages therebetween may be exploited by the systems and methods disclosed herein to drive to feasible potential solutions to evaluate according to the multiple objectives of the optimization problem.

In other manufacturing based examples, a variety of factory-based manufacturing parameters of various manufacturing equipment may be optimized for any variety of objectives, such as manufacturing yield and/or manufacturing throughput, etc. In example embodiments, the systems and methods, as described herein, may be particularly suited for performing optimizations for problems with a relatively high level of constraints based at least in part on decision variables producing constraint violations that may result from a value of one or more other decision variables.

FIG. 1 is a schematic diagram that illustrates an optimizing system 100 with input parameters 110 and optimized solutions 140 based on one or more models 120 for a multi-objective optimization algorithm (MOOA) system 130, in accordance with example embodiments of the disclosure. In example embodiments, the multi-objective optimization system 130 may be a multi-objective evolutionary algorithm (MOEA) system. The MOOA system 130, in example embodiments, may be configured to perturb decision variables (e.g., genes of a chromosome) to reduce and/or eliminate constraints. While a particular configuration of the optimizing system 100 is depicted herein, it will be appreciated that the configuration may vary depending on particular application of the MOOA system 130, according to various embodiments of the disclosure. Indeed, there may be any variety of input parameters 110, models 120, MOOA system 130, and/or optimized solutions 140.

The input parameters 110 may be any suitable set of parameters, including, in example embodiments, a listing of decision variables, such as decision variables and attributes of those decision variables. Decision variables may be the elements that may be thought of as arranged as genes in a chromosome (e.g., data elements in an array). The decision variables may be the elements that are optimized during an multi-objective optimization as performed by the MOOA system 130. These multi-objective optimizations may generate an optimized solution that may be implemented as a baseline implementation of a particular entity (e.g., airline network, factory, hotel chain operator, etc.). For example, in the context of pricing hotel rooms, as discussed above, decision variables may include the price of each of the various types of rooms, where the types of the rooms may be described by the attributes of the decision variables. The attributes may include any variety of descriptors and/or parameters associated with a corresponding decision variables. These descriptors may be any variety of naming of the item or any type of parameters that may indicate any quality or naming of the items. For example, in reference to the previous example of the hotel rooms, the attributes may include descriptors of a particular element (e.g., type of hotel room). Such descriptors may include, for example, location, single occupancy, double occupancy, beach facing, garden facing, high floor, handicap access, suite, twin beds, king bed, combinations thereof, or the like. It will be appreciated that attributes may further serve as a mechanism to tag, name or otherwise refer to a particular decision variable among more than one (e.g., many) decision variable.

In some example embodiments the MOOA system 130 may be driving to reduced constraint and/or feasible solutions to evaluate, such as by implementing any variety of perturbations to genes in a chromosome representing a potential solution. In some example embodiments, the perturbation may be cascading, in that a particular gene value may affect more than one other gene, such as in a cascading fashion. In some example embodiments, the MOOA system 130 may implement a secondary optimization where feasible solutions may be generated. In some cases, a weight vector for perturbing chromosomes for greater feasibility (e.g., reduced and/or eliminated constraints) may be learned.

The models 120 may include objective model(s), constraint model(s), and/or mesh objective models that may be used by the MOOA system 130 for evaluating solutions according to the multiple objectives, determining constraints of solutions (e.g., infeasible solutions), and/or identifying meshing chromosomes, respectively. The objective models may provide value(s) for any variety of objectives that may be optimized. For example, with pricing optimization problems, the objective model(s) may be used to evaluate potential solutions for objective performance such as total profit, total revenue, customer dissatisfaction metrics, probability of outselling the product, combinations thereof, or the like. The constraint models may provide value(s) for any variety of constraints that may be navigated in the constraint optimization mechanism. For example, with pricing optimization problems, the constraint model(s) may be used to evaluate the total number of sales of a particular item at a particular price point. According to example embodiments, the constraint model(s) may provide information about which gene has a constraint, what gene(s) the constraint is based upon, and/or the magnitude of the constraint. This information about the constraints may be applied to learning models to generate decision variable perturbation model(s), such as weight vector(s) that may be used to perturb genes of a chromosome to attempt to reduce and/or eliminate constraints of the chromosome.

In some example embodiments, the input models 140 may include decision variable perturbation model(s). These decision variable perturbation model(s) may include weight vector(s) that may be used to perturb the decision variables, such as in a cascading manner within chromosomes to make those chromosomes more feasible (e.g., having relatively less constraints) and/or completely feasible (e.g., without any constraints). The weight vector(s) may include multiplicative weights (e.g., linear transformation, etc.), additive weights (e.g., affine transformation, etc.), and/or any suitable type of transformation and/or perturbation of genes of a chromosome. These perturbation parameters, as provided in decision variable perturbation models may be predetermined from known linkages between decision variables, and/or learned from previous optimizations that may have included secondary optimizations for driving potential solutions to feasibility.

As shown, the result of optimization based on the input parameters 110 and by using the models 120, outputs 140 may be generated by the MOOA system 130. The outputs 140 may be one or more variables that are optimized in accordance with the models 120 by the MOOA system 130. For example, in a pricing optimization problem, the outputs may be an indication of a price or range of prices of various products (e.g., hotel rooms, airline flights, insurance products, investment products, types of mobile electronic devices, etc.) that do not violate any constraints, or at least minimizes constraint violations, while providing an optimized solution on the basis of the one or more objective functions. In another non-limiting example, in a scheduling optimization problem, the outputs may be an indication of a time or range of times of various events (e.g., airline flights, project milestones, etc.) that do not violate any constraints, or at least minimizes constraint violations, while providing an optimized solution on the basis of the one or more objective functions.

In example embodiments, when outputs 140 or multi-objective optimized solutions are discussed, the objective values may be pareto-optimized. In this case, no single objective may be optimized at the cost of other of the multi-objectives. Instead, in example embodiments, the optimization front (e.g., in a multiple objective space) may be optimized as far as possible. When potential solutions are evaluated by the MOOA system 130, a non-domination test may be performed to identify solutions that may be used for generation of subsequent populations of solutions (e.g., child populations generated by cross-over, selection, and/or mutation). In some example embodiments, non-dominated solutions, or otherwise solutions that are better than any previous solution with regards to at least one objective and no worse with regards to all objectives, may be propagated for child solutions.

In example embodiments, the output 140 may also include a variety of derivative outputs associated with the collection of pareto-optimized solutions or a single optimized solution. These derivative outputs may be an expected progression of metrics associated with an optimized solution. In additional example embodiments, the outputs 140 may also provide a perturbation model for perturbing decision variables to reduce and/or eliminate constraints. In some example embodiments, links between decision variables may also be provided in the output 140.

Figure 2:
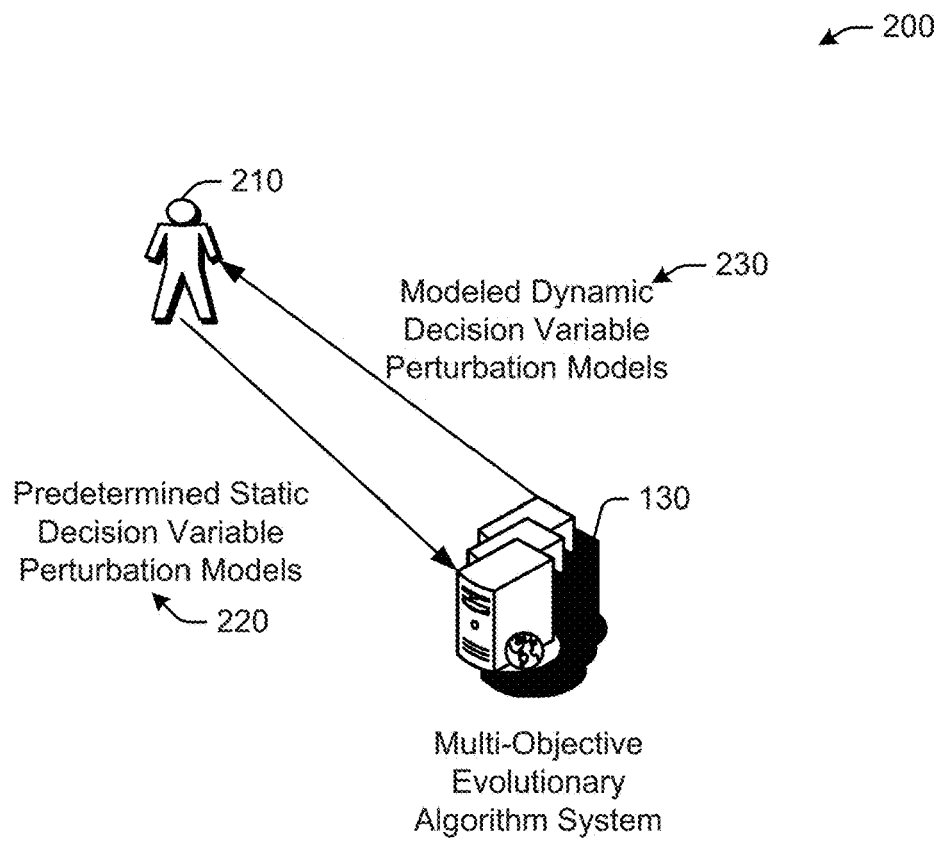
FIG. 2 is a schematic diagram that illustrates an example environment with the MOOA system of FIG. 1 receiving and/or providing decision variable perturbation models, in accordance with example embodiments of the disclosure.

FIG. 2 is a schematic diagram that illustrates an example environment 200 with the MOOA system 130 of FIG. 1 receiving and/or providing decision variable perturbation models 220, 230, in accordance with example embodiments of the disclosure. As discussed above, in some example embodiments, decision variable perturbation models 220 may be pre-determined, based at least in part on known linkages between decision variables. For example, it may be known, when an aircraft is to be flown from one city to a second city and then to a third city, how much time should transpire between departing from the first city and the second city, such that a constraint violation shall not occur. Such a priori information may be codified into predetermined static decision variable perturbation models 220 that may be applied to potential chromosomes that are to be evaluated according to objective value performance. In some example embodiments, predetermined static decision variable perturbation models 220 may be models that had been previously learned, such as by the MOOA system and generated as a modeled dynamic decision variable perturbation model 230.

In example embodiments, the decision variable perturbation models 230 may be dynamic and may be learned and/or refined by the MOOA system 130. In some cases, the learning may be ex-situ and performed on a set of learning data. In other cases, the learning may be in-situ and performed while a multi-objective optimization is in progress. In some example embodiments, a modeled dynamic decision variable perturbation model 230 may be generated as a revision, based at least in part on further learning, of a predetermined static decision variable perturbation model 220. Any variety of models and/or learning tools may be used for the learning of the decision variable models and/or weight vectors included therein. Such learning techniques may include, for example, neural networks, linear regression, Bayesian tree models, genetic algorithms, combinations thereof, or the like.

The decision variable perturbation model(s) 220, 230 may include weight vector(s) that may be used to perturb the decision variables, such as in a cascading manner within chromosomes to make those chromosomes are feasible (e.g., having relatively less constraints) and/or completely feasible (e.g., without any constraints). The weight vector(s) may include multiplicative weights (e.g., linear transformation, etc.), additive weights (e.g., affine transformation, etc.), and/or any suitable type of transformation and/or perturbation of genes of a chromosome. These perturbation parameters, as provided in decision variable perturbation models may be predetermined from known linkages between decision variables, and/or learned from previous optimizations that may have included secondary optimizations for driving potential solutions to feasibility. In example embodiments, the decision variable perturbation model(s) 220, 230 may include any suitable set of rules for checking and/or perturbing decision variables. For example, for a particular chromosome, applying the perturbation models 220, 230 may entail checking for constraints induced by other genes and then perturbing that gene and/or the other genes on which the constraint is based to reduce and/or eliminate the constraint. In this way, the perturbation models 220, 230 may include a set of rules that allow checking one or more relationships between two or more genes and then, if a constraint violation is found, modify those two or more genes appropriately to at least reduce the level of constraints.

Figure 3:
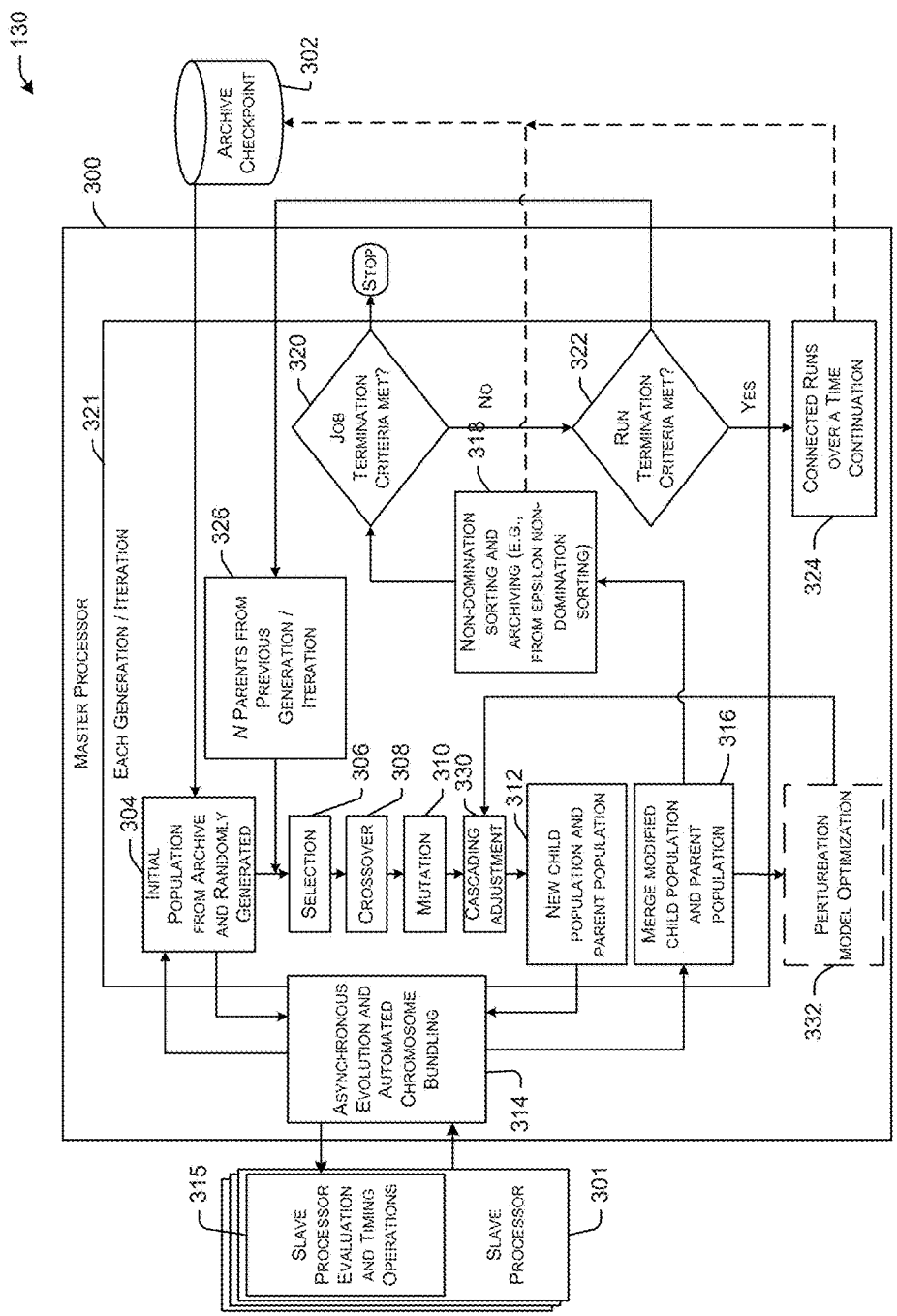
FIG. 3 is a block diagram that illustrates the example MOOA system of FIG. 1 with a perturbation model operation for cascading modifications to genes of chromosomes, in accordance with example embodiments of the disclosure.

FIG. 3 is a block diagram that illustrates the example MOOA system 130 of FIG. 1 with a perturbation model operation for cascading modifications to genes of chromosomes, in accordance with example embodiments of the disclosure. In some example embodiments, the MOOA system 130 may be an evolutionary algorithm system, such as those described in at least U.S. Pat. Nos. 8,255,344 and 8,285,653, both of which are incorporated herein, in their entirety by reference.

The evolutionary algorithm system 130 may employ techniques of biologic natural selection to efficiently search a multi-objective optimization space that may not be amenable to search by analytic, iterative, or other methods. In example embodiments, the search variables or decision variable, such as the prices of various items in a pricing problem, may be organized as a data structure that resembles genes in a chromosome or data elements in a data array. In example embodiments, the decision variables of the optimization problem (e.g., scheduling problem) may be organized as an allocation of variables that are to be optimized according to the multiple objectives of the optimization problem. In other words, the solution may be represented as a data structure having the various decision variables. In some example embodiments, the solutions may be organized as chromosomes with genes (e.g., individual decision variables) at the MOOA system 130.

Upon organizing the search variables, the evolutionary algorithm may proceed to generate child chromosomes, from parent chromosomes. Therefore, in example embodiments, the "children" to evaluate in any given generation may be based, at least in part on the "parents" or a subset thereof, from the previous generation. The evolutionary algorithm may be configured to evaluate the chromosomes (e.g., prices of items, schedule of train departures, etc.) from any given generation, based at least in part on the corresponding respective performance on the multiple objectives that are being used to evaluate the optimization problem (e.g., pricing optimization, schedule optimization, etc.). The MOOA system 130, may further be configured to select those chromosomes (e.g., solutions) that display the best performance according to the multiple objectives, in any given generation and use those chromosomes to generate children by cross-over. Cross-over may introduce diversity, while preserving as-yet known advantageous genes, into the population of solutions to be evaluated and considered within the search space to arrive at an optimal solution. The evolutionary algorithm system may further be configured to introduce mutations (i.e. random or pseudo-random changes in one or more genes of a child chromosome) to introduce further diversity of potential solutions within the search space for the purposes of selecting a relatively optimized solution set (e.g., flight times in an airline network) in accordance with the identified objectives of the optimization. When new child solutions are generated using the biological-styled processes described above, a check for feasibility may be performed. If a potential solution is not feasible, then in some example embodiments, a drive to feasibility may be performed, such as by a constraint minimization engine. In other example embodiments, potential solutions that are found to be not feasible may be eliminated from the population of solutions that are to be evaluated from a multi-objective standpoint. In yet other example embodiments, solutions that are found to be not feasible may be retained in the population to be evaluated on a multiobjective performance basis. In some of these cases, the non-feasible solutions may be retained for a limited period of time (e.g., one generation, predetermined number of generations, etc.). In the same or other cases, the non-feasible solutions may be tagged as such, so that the genetic material of the non-feasible solutions may be used to drive to more optimized solutions, without allowing the non-feasible solutions to be presented as an optimized solution.

According to example embodiments of the disclosure, the MOOA system 130 may further be configured to generate a collection of mesh points mapping the objective space of an optimization. Although the mesh points and the meshing of the objective space may not lead to any resource (e.g., compute resources, time, etc.) efficiency in the current optimization, the mesh information may be used in a re-optimization, such as a reformulated re-optimization.

It can be seen that the mechanisms used by the evolutionary algorithm (e.g., genetic operators, selection, crossover, mutation, etc.), particularly in the form of a multi-objective evolutionary algorithm system 130, are not mechanisms that are limited to arrive at a convergence in an iterative fashion. Indeed, the mechanism is one that employs intelligent "hopping around", or a directed random search, and evaluating according to optimization objectives and/or constraint limitations, rather than just a convergence mechanism. It will be appreciated that such as framework may be amenable to solving multi-objective, multi-dimensional, and/or highly constrained problems, where relative pockets of "good performance" and/or optimized performance according to the optimization objectives may not always be contiguous. In these types of problems, analytical methods (e.g. Lagrange multipliers, etc.), iterative convergence methods (e.g. Newton's method, etc.), and/or methods that rely on relatively high degree of a priori knowledge of trade-offs in the search space may not be as effective at arriving at an optimized solution as the multi-objective evolutionary algorithm system 130, as described herein. Although the multi-objective evolutionary algorithm system 130 is discussed herein, it will be appreciated that any suitable system for implementing a heuristic optimization, such as, but not limited to Monte Carlo methods, extremal optimization (EO) methods, Particle Swarm Optimization (PSO), Ant Colony Optimization (ACO), etc. may be implemented in accordance with example embodiments of the disclosure.

In this example embodiment, the MOOA system 130 may be implemented as an example parallel processing system that executes an evolutionary algorithm, according to an example embodiment of the disclosure. As shown in FIG. 3, a first portion of the evolutionary algorithm may be performed by a master processor 300 while a second portion of the evolutionary algorithm may be performed by one or more slave processors 301, as discussed herein. In some example embodiments, the constraint and/or objective evaluation may be implemented on the slave processor(s) 301, while the objective optimization engine may be implemented on the master processor 300.

In an example embodiment of the disclosure, an executed job of the evolutionary algorithm may comprise a plurality of connected runs 322 that occur in a sequence to form a time continuation. Each run 322 may comprise one or more evolutionary operations performed during one or more generations/iterations 321. It will be appreciated that a run may be connected to a prior run in that at least some of the same parents are shared in the "initial population" of launch parameters utilized for initiating respective runs, according to an example embodiment of the disclosure.

Example processing by an executed job of the evolutionary algorithm will now be discussed in further detail. Referring now to block 304, the master processor 300 may receive or obtain an initial population of parent chromosome data structure (e.g., an initial set of prices that may be allocated to one or more hotel room types (items)). In other words, the initial population may represent a starting point, such as a best guess or a set of parameters that may represent the current implementation prior to the benefits of the optimization(s), as described herein. In an example embodiment of the disclosure, each parent chromosome data structure (e.g., departure times in a scheduling problem, prices for items in a pricing problem, etc.) may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Math Variable: A variable may be derived based upon an equation using operands comprising either constants or variables that specify values from other elements specified. The variable names may follow the name convention <alphabetic character><number>, where the <alphabetic character> may specify the column position of elements within an array and/or spreadsheet, and the <number> may specify the row position within the array and/or spreadsheet. It will be appreciated that a math variable may be a fixed or constant value (double precision or integer precision).

Function Variable: A variable may be produced by a function call, which may include calling arguments of a plurality of other constants, and variables.

Any one of the static variables, evolved variables, the derived variables, the math variables, and/or the function variables may be of a variety of types including, but not limited, to integer, double precision, characters, Boolean (two possible values, e.g. 'ON' or 'OFF'; '0' or '1'; 'TRUE' or 'FALSE'), pair of double precision numbers pair of integers array of double precision numbers, array of integers file/spreadsheet, and/or Gaussian.

Still referring to block 304, the initial population of parent chromosome data structures may be obtained by one or more sources. In an example embodiment of the disclosure, the initial population of parent chromosome data structures may be obtained from a combination of the archive checkpoint 302 and random generation of new chromosome data structures. The archive checkpoint 302 may include a known solution, such as an experiential solution. As a non-limiting example, 25% of the initial population of parent chromosome data structures may be obtained from the archive checkpoint 302 while 75% of the initial population may be randomly generated. The chromosomes obtained from the archive checkpoint 302 may have previously been evaluated in accordance with the objective functions. On the other hand, the randomly generated chromosomes may not have been evaluated in accordance with the objective functions, and thus, they may be delivered to block 314, which allocates the chromosomes to the slave processors 301 for objective function evaluation by block 315. In certain embodiments, the initial population of parent chromosomes may include one or more known solutions, or a baseline solution, provided to the heuristic optimizer system in the form of an evolutionary algorithm system. In some example embodiments, if the current optimization is a reformulated re-optimization, then the chromosomes in the initial population at block 304 may be received from a mesh archive 332 and/or an objective refinement system 150 that has access to the mesh archive 332.

The archive checkpoint 302 may include an elite set of chromosome data structures (i.e., elite solutions of scheduled departure times) obtained from one or more prior generations/iterations 321, according to an example embodiment of the disclosure. Initially, the archive checkpoint 302, in certain embodiments, may be populated with one or more known solution chromosomes, such as a baseline chromosome solution. Alternatively, if no baseline solution is known, the archive checkpoint may initially be populated with a derived known solution using a variety of suitable mechanisms, such as vastly infeasible search space mechanism. The archive checkpoint 302 may take the form of a data file or database stored in a computer memory, computer disk, network storage, or other non-volatile memory. In accordance with embodiments of the disclosure, the archive checkpoint 302 may contain one or more elite set of chromosomes, such as known solutions.

Archived chromosome data structures that were previously evaluated in a prior generation/iteration 321 may be associated with a plurality of objective function values corresponding to a respective plurality of objective functions. Each objective function may be associated with any predefined objective to be optimized by the executed job of the evolutionary algorithm. For example, in a pricing problem, an objective function may be associated with achieving a high profit level, and a corresponding objective function value may indicate which chromosome data structure (based upon the included chromosome and its respective genes) is able to achieve the greatest profit. It will be appreciated that in many cases, there may be multiple objectives. It will further be appreciated that in some cases, one or more of the objectives may not be independent of each other. Indeed, the objective functions may have non-zero correlation to each other. It will yet further be appreciated that the objective functions may be of any suitable variable type, such as integer, double precision, characters, Boolean, or the like.

Alternatively, in block 304, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 314, which may allocate the chromosomes to the slave processors 301 for objective function evaluation and/or constraint function evaluation by block 315. Once the objective function evaluations in block 315 have been completed, and the objective function values have been received in block 314, then each of the randomly generated parent chromosome data structures may be associated with a respective plurality of objective function values.

Having received or obtained the initial population of parent chromosome data structures in block 304, processing may then proceed to block 306. In block 306, the master processor 300 may select pairs of parent chromosome data structures from the input population of parent chromosome data structures. In an example embodiment of the disclosure, the selection of the pairs of parent chromosome data structures may occur according to a tournament selection process, which may include a crowded tournament selection process. An example tournament selection process in accordance with an example embodiment of the disclosure may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the disclosure. The winners of each tournament become the two parents resulting from the selection process of block 306. It will be appreciated that a predetermined number of pairs of parent chromosome data structures may be selected in block 306. It will also be appreciated that a particular parent chromosome data structure may be present in two or more selected pairs of parent chromosome data structures, according to an example embodiment of the disclosure. In some cases, the number of parent chromosomes selected in each round or iteration may be dynamic.

Following block 306, the chromosomes in selected pairs of parent chromosome data structures may be subject to one or more evolutionary operators to generate a plurality of child chromosome data structures, according to an example embodiment of the disclosure. Two example evolutionary operators are illustrated by blocks 308 and 310. For example, block 308 illustrates a cross-over evolutionary operator in which a portion of the parameter values or "gene" values (i.e. individual launch parameters of a satellite of the satellite constellation under design) may be exchanged between chromosomes in selected pairs of parent chromosome data structures to generate new pairs of chromosome data structures. In an example embodiment of the disclosure, the cross-over evolutionary operation may be capable of performing cross-over using integer or non-integer numbers (e.g., double precision numbers, etc.), binary representation of numbers, letters, and/or symbols. As another example, block 310 illustrates a mutation evolutionary operator in which a parameter value or gene value (e.g., an evolved variable value) in a chromosome may be varied or otherwise changed to another value by a mutation.

It will be appreciated that the cross-over evolutionary operator and the mutation evolutionary operator need not necessarily be applied to genes of each received chromosome in the chromosome data structure. In an example embodiment of the disclosure, only a portion or percentage of the received chromosomes in the chromosome data structures in blocks 308 and 310 may have their genes crossed-over or mutated, respectively. The respective portions or percentages that are crossed-over and/or mutated may be predetermined or dynamically varied during operation of the evolutionary algorithm, according to an example embodiment of the disclosure. For example, a first predetermined portion or percentage (e.g., 50%-80%) of the received chromosomes of the chromosome data structures may have genes that are crossed over in block 308 while a second predetermined portion or percentage (e.g., 1%-3%) of the received chromosomes of the chromosome data structures may have genes that are mutated in block 310. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 308 and 310 may be available without departing from example embodiments of the disclosure. Likewise blocks 308 and 310 may be performed in a different order than that shown in FIG. 3 or otherwise combined into a single block without departing from example embodiments of the disclosure.

It will be appreciated that in some example embodiments, there may be operators that may be applied to chromosomes other than, or in addition to, the cross-over and/or mutation operators. These non-genetic algorithm operators may include, for example, particle swarm optimization (PSO) with PSO operators. PSO operators may include agents that applies rules to transition from a given state to another state to generate solutions to evaluate. Such PSO agents may determine and utilize a velocity vector as the basis for these types of state transitions, such as by specifying direction and/or speed of subsequent step(s).

After the evolutionary operations of block 306, 308, and 310, a new population of child chromosome data structures (i.e. launch parameters to be evaluated) may be obtained in block 312. Following block 312, processing may proceed to block 314. In block 314, the new population of child chromosome data structures may be received into a "To Evaluate" list or queue. Block 314 may then allocate the chromosome data structures from the "To Evaluate" list or queue to the plurality of slave processors 301 according to an asynchronous evolution process. An automated chromosome bundling process may also be utilized in block 314 to determine how many chromosome data structures should be included in a respective chromosome bundle for a respective slave processor 301. For example, a slave processor 301 with faster processing capability may receive a chromosome bundle with a larger number of chromosome data structures. Alternatively, the slave processor 301 may receive a fixed number of launch parameters sets in the form of chromosome data structures in a chromosome bundle, but simply receive a larger number of chromosome bundles within a predetermined amount of time. The example automated chromosome bundling process may allow efficient allocation of chromosome data structures among the plurality of slave processors 301. In some cases, a number of flags, indicating the number of genes that are permitted to be considered as deviating from the baseline solution chromosome, may be considered in the bundling process.

At block 330 cascading adjustments may be made to chromosomes to reduce the level of constraints that those newly generated chromosomes may have when evaluated according to the constraint models. These perturbation models may be learned and provided for the purposes of finding feasible solutions. The perturbation model may take the form of a data file or database stored a variety of weights (e.g., offsets, multipliers, forward weights, reverse weights, etc.) by which non-feasible chromosomes may be modified to be feasible, or at least less constrained. In accordance with embodiments of the disclosure, the perturbation model may be provided as a predetermined model, such as one that had been learned from training data and/or previous optimizations. In other cases, the perturbation models may be optimized, such as in optional block 332. In example embodiments, applying the chromosomes generated by the biologic operations of blocks 306, 308, 310 to the perturbation models may result in cascading adjustments of one or more genes of the chromosomes to reduce the constraints upon and/or generated by those adjusted genes.

In block 315, each slave processor 301 may have received a chromosome bundle comprising one or more chromosome data structures from the master processor 300. Additionally, in certain embodiments, the slave processors 301 may further receive a baseline chromosome or solution organized in any manner, representing a known solution. The slave processors 301 may be homogenous or heterogeneous in processing capability. Each slave processor 301 may evaluate, in accordance with a plurality of objective functions, the received chromosome bundle of chromosome data structures, and/or the baseline solution chromosome to generate a plurality of respective objective function values for each chromosome data structure in block 315. In some example embodiments, the slave processors 301 may further perform the functions of constraint minimization. The slave processors 301, therefore, in example embodiments, receive a solution to be both constraint minimization driving, in addition to objective value determination. In addition, each slave processor 301 may also perform timing operations or calculations, including determination of certain wait times and/or evaluation times associated with the respective slave processor 301, in block 315. As each slave processor 301 finishes the objective function evaluations and/or timing operations in block 315, the slave processor 301 may provide a results bundle (e.g., objective function values) and timing data (e.g., wait times and/or objective function evaluation times) to the master processor 300. The slave processor 301 may further receive, in example embodiments, a constraint violated solution and return a constraint non-violated solution to the master processor 300. As a result, the constraint minimization engine may be implemented on the slave processors 301 in accordance with example embodiments. In some of these example embodiments, the slave processors 301 may further provide objective values, as determined using the objective models 120, along with the non-constraint solutions. The master processor 300 may provide the received objective function values as well as an identification of the corresponding evaluated child chromosome data structures to a "Finished" list or queue. It will be appreciated that with asynchronous evolution processing, the objective function results may be included in the "Finished" list or queue on an as-received basis from the slave processor 301. Indeed, the evolutionary process may be asynchronous in that as soon as the "To Evaluate" list is empty for a given generation/iteration 321, the processing taking place in block 314 is completed, where the child population passed to block 316 is comprised of all of the chromosome data structures currently within the "Finished" list. It will be further appreciated that the results from some of the chromosome bundles previously sent to the various slave processors 301 may not have been received at the time the "To Evaluate" list is emptied. These may be referred to as late chromosome data structures from one or more prior generations/iterations.

In block 316, the master processor 300 may receive a modified child population of chromosome data structures from the asynchronous evolution process of block 314. In certain embodiments, the modified child population may include different chromosome structures as well as a different number of chromosome data structures as compared to the child population of block 312. The received modified child population is merged with the current parent population, as illustrated by block 316.

In optional block 332, perturbation models that were used in block 330 may be optimized and/or updated. The chromosomes returned at block 316 with any indication of constraint violation information (e.g., location gene(s), cause gene(s), and magnitude) may be provided to one or more learning models. The learning models may use the constraint information to refine the perturbation models (e.g., weight vectors) for bringing the chromosomes to greater feasibility. The perturbation models may include any suitable model including, but not limited to, neural networks, linear regression, Bayesian tree models, genetic algorithms, combinations thereof, or the like.

In block 318, the master processor 300 may perform non-domination sorting (e.g., based off of an epsilon vector) of the merged list of child and parent chromosome data structures of launch parameter sets under evaluation to identify an elite set of chromosome data structures based at least in part on the corresponding objective function values. According to an example embodiment, non-domination sorting may utilize the concept of domination to compare solutions provided by the merged list of child and parent chromosome data structures. A solution $x_1$ is said to dominate solution $x_2$ if both conditions 1 and 2 identified below are true:

Condition 1: The solution $x_1$ is no worse than $x_2$ in all objectives.
Condition 2: The solution $x_1$ is strictly better than $x_2$ in at least one objective.

If both conditions 1 and 2 are satisfied, then all of the following statements are substantially equivalent:

$x_2$ is dominated by $x_1$,
$x_1$ is non-dominated by $x_2$, or
$x_1$ is non-inferior to $x_2$.

Accordingly, non-domination sorting in block 318 may be performed to determine a set of chromosome data structures (e.g., designs) that are non-dominated with respect to other solutions when comparing the respective objective function values corresponding to the objective functions. For example, non-domination sorting may involve classifying the merged list of child and parent chromosome data structures into multiple fronts (for two objective functions), surfaces (for three objective functions), volume (for 4 objective functions), or hypervolumes (for 5+ objective functions) based off of their respective domination rank. In an example embodiment of the disclosure, domination ranking may proceed by first considering the entire merged list of child and parent chromosome data structures. The objective function values corresponding to the objective functions for each chromosome data structure are compared and the non-dominated solutions from the list are identified. These solutions are assigned a domination rank of 1 and removed from the merged list. The reduced merged list of child and parent chromosome data structures are then considered and the next set of non-dominated solutions are identified and assigned a rank of 2. This process is iterated until all members of the merged list are assigned a domination rank. In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cuboid surrounding a solution in which no other solutions are present. The obtained elite set of chromosome data structures for the particular generation/iteration may be stored in the archive checkpoint 302 or another archive of a computer memory or other data storage for subsequent retrieval. At this point, the solutions (e.g., chromosomes), as stored in the checkpoint 302, may be generated based at least in part on both objective function based evaluation of the objective optimization engine 210 and constraint minimization based evaluation of the constraint minimization engine 220.

Following processing in block 318, processing may proceed to block 320. In block 320, a determination is made as to whether the current job is completed such that the evolutionary algorithm should be terminated. A job typically comprises processing involving a plurality of connected runs 324, where each run 324 may include processing associated with one or more generations/iterations 321. Block 320 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria. In other words, the optimization may terminate if the improvements on a predetermined number of iterations of the objective optimization with non-constraint solutions have not improved substantially. In an example embodiment of the disclosure, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations. It will be appreciated that the obtained solutions comprising the chromosome data structures may be output in a variety of formats, including a database format, a comma separated value (CSV) format, or a graphical format.

If block 320 determines that the job is not complete, then processing may proceed to block 322 to determine whether the current run 324 has completed. In determining whether the current run is complete, block 322 may determine whether a current run 324 has failed to produce improvement in quantity and quality of the solutions generated from the prior iterations/generations 321. The quantity measure may be based upon the number of solutions. The quality measure may be based on some quantification of distance from a utopia point, box fitness, or yet another measure.

If block 322 determines that a current run 324 is not complete, then processing may proceed to block 326, wherein a population of parent chromosome structures may be obtained or otherwise selected from the elite chromosome data structures determined from block 318. The prior process may then be repeated for another generation/iteration 321 using the parent chromosome data structures from the prior generation/iteration. It will be appreciated that because the evolution process of block 314 is asynchronous, there may be one or more late child chromosome data structures received in the "Finished" list or queue in 316 that are associated with one or more pairs of parent chromosome data structures allocated to slave processors 301 during one or more prior generations/iterations. Therefore, in the next generation/iteration 321, the merged children chromosome data structures in block 316 may likewise include those late child chromosome data structures as well as current child chromosome data structures from parent chromosome data structures allocated to slave processors 301 during the current generation/iteration 321.

On the other hand, block 322 may determine that a current run 324 is complete. For example, looking back over a predetermined number of generations, the search may have failed to produce improvement in the solutions during each generation/iteration 321 of the current run 324. Improvement may be based upon the quantity of the solutions (e.g., the number of solutions) and the quality of the solutions (e.g., some quantification of distance from a utopia point, box fitness, etc.). In this case, the current run 324 may be completed, and processing proceeds to initiate a subsequent run 324. The subsequent run 324 may generate an initial population by invigorating the elite solutions stored in the archive checkpoint 302. In particular, the subsequent run 324 may utilize a first number of the elite solutions from the archive checkpoint 302 as part of the initial population utilized in block 304, but may also invigorate the initial population by adding a second number of randomly generated parent chromosome data structures. In example embodiments, the elite solutions may be non-constraint solutions. In example embodiments, the elite solutions may be non-constrained. The randomly generated parent chromosome data structures may be generated and evaluated using the example processes discussed with respect to blocks 304 and 314.

In some example embodiments, the processors 300, 301 of the MOOA system 130 may be implemented as appropriate in hardware, software, firmware, or combinations thereof. Software or firmware implementations of the processors 300, 301 may include computer-executable or machine-executable instructions written in any suitable programming language to perform the various functions described. Hardware implementations of the processors 300, 301 may be configured to execute computer-executable or machine-executable instructions to perform the various functions described. The one or more processors 300, 310 may include, without limitation, a central processing unit (CPU), a digital signal processor (DSP), a reduced instruction set computer (RISC), a complex instruction set computer (CISC), a microprocessor, a microcontroller, a graphical processor unit (GPU), a field programmable gate array (FPGA), or any combination thereof. The multi-tiered optimization system 130 may also include a chipset (not shown) for controlling communication between the one or more processors 300, 301 and one or more of the other components of the s multi-tiered optimization system 130. The one or more processors 300, 301 may also include one or more application specific integrated circuits (ASICs) or application specific standard products (ASSPs) for handling specific data processing functions or tasks. In example embodiments, the MOOA system 130 may further include input/output (I/O) device(s) such as display screen(s), touch sensitive display screen(s), speaker(s), haptic device(s), or the like, may be controlled via one or more I/O device interfaces.

The MOOA system 130 may still further include memory for storing applications and/or instructions that may be executed by the processors 300, 301 to perform functions described herein. The memory may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

It will be appreciated that the solutions as determined by the MOOA system 130 may be optimized for multiple objectives, while being viable (in accordance with all constraints of the optimization problem). Many-objective optimization not only allows one to independently quantify the various coverage criteria but also allows one to do this in a way that minimizes simplifying assumptions. The goal of multiple-objective optimization, in contrast to the single-objective optimization case where the global optimum is desired (except in certain multimodal cases), is to maximize or minimize multiple measures of performance simultaneously whereas maintaining a diverse set of Pareto-optimal solutions. The concept of Pareto optimality refers to the set of solutions in the feasible objective space that is non-dominated. A solution is considered to be non-dominated if it is no worse than another solution in all objectives and strictly better than that solution in at least one objective. Consider a situation where both f1 and f2 objectives are to be minimized, but where the two objectives are in conflict, at least to some extent, with each other. Because both objectives are important, there cannot be a single solution that optimizes the f1 and f2 objectives; rather, a set of optimal solutions exists which depict a tradeoff.

Figure 4A:
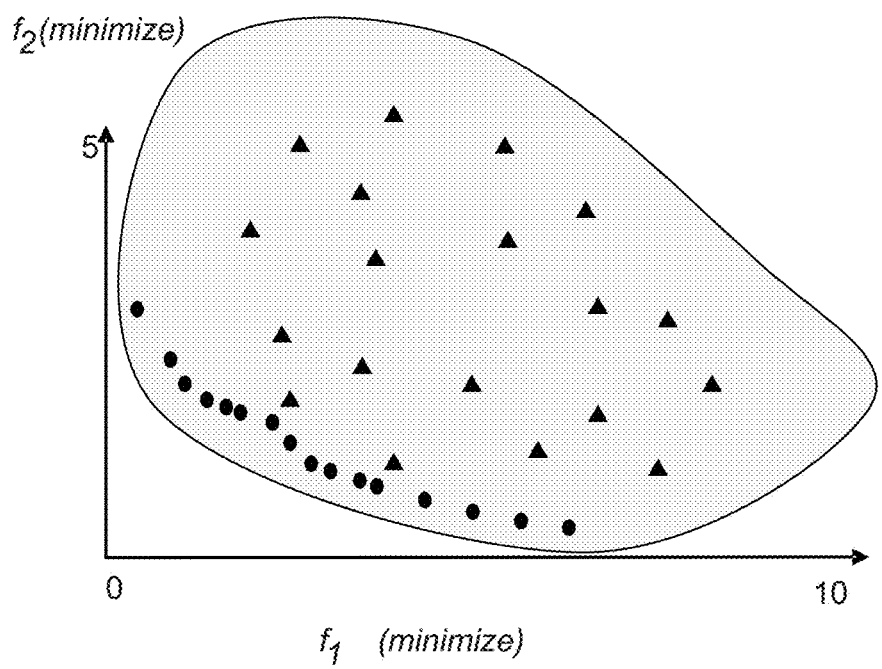
FIGS. 4A and 4B are charts illustrating an example pareto-optimized solution to a multi-objective problem, in accordance with example embodiments of the disclosure.
Figure 4B:
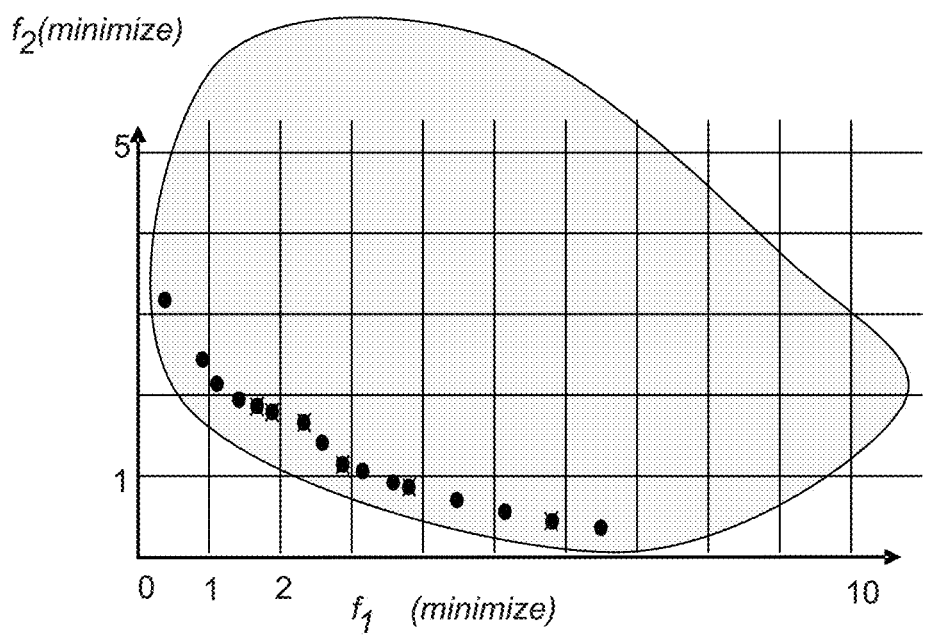

FIGS. 4A and 4B are charts illustrating an example pareto-optimized solution to a multi-objective problem, in accordance with embodiments of the disclosure. Initially, a first non-domination sorting may be applied to the current population to remove solutions that are dominated by at least one other solution in the objective space. It will be appreciated that a solution is non-dominated by another solution because it is strictly better in at least one objective function (determined by comparing the objective function values) and no worse than the eliminated solution with respect to the remaining objective functions (determined by comparing the objective function values).

Following the first non-domination sorting, epsilon non-domination sorting may be applied to the remaining solutions in the current population. Epsilon non-domination sorting may include plotting or mapping the remaining solutions to a first epsilon value for objective function $f_1$ and a second epsilon value for objective function $f_2$, according to an example embodiment of the invention. The first epsilon value may be associated with a first epsilon spacing or step size $\varepsilon_1$ associated with objective function $f_1$, and a second epsilon value may be associated with second epsilon spacing or step size $\varepsilon_2$ associated with objective function $f_2$. Each solution may then be associated with an epsilon vector or epsilon box address ($\varepsilon_1, \varepsilon_2$) corresponding to the first epsilon value and the second epsilon value. If two or more solutions have the same epsilon box address, then the epsilon non-domination sorting may retain a single solution per epsilon box address ($\varepsilon_1$, $\varepsilon_2$). This solution may be determined based upon whether objective functions $f_1$ and $f_2$ are being minimized or maximized, according to an example embodiment of the invention. It will be appreciated that while only two objective functions are described herein, other example embodiments may utilize more than two objective functions without departing from example embodiments of the invention. For example the f1 and f2 values may correspond to profit and revenue in item pricing problems.

In an example embodiment of the invention, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations.

FIG. 4A illustrates a feasible design region associated with a first objective function $f_1$ and a second objective function $f_2$. Within the feasible design region is a snapshot of a population of solutions of a given generation/iteration, according to an example embodiment of the invention. Based upon the goal of minimizing the first and second objective functions $f_1$ and $f_2$, non-domination sorting identifies all of the circles as being non-dominated solutions and all of the triangles as dominated solutions. The dominated solutions may be eliminated from the population or removed from further consideration, according to an example embodiment of the invention. It will be appreciated that the goals of minimizing the f1 and f2 are merely an example. In other examples, such as in a pricing problems, the goal may be to maximize f1 and f2, particularly if f1 is revenue and f2 is profit. In yet other optimization problems, the goal may be to maximize f1 and minimize f2, or vice-versa.

In FIG. 4B, epsilon non-domination sorting may be applied to the remaining solutions (e.g., non-eliminated solutions) from the first non-domination sorting of FIG. 4A. An epsilon spacing or step size can be defined for objective functions $f_1$ and $f_2$ to generate an epsilon grid in the objective space, where following epsilon non-domination sorting, only one solution exists in each block/box of the grid defined by an epsilon box address. In FIG. 4B, the epsilon non-dominated solutions are illustrated by circles, while the epsilon dominated (inferior) solutions are illustrated by the crossed-out circles. Because both of objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of objective functions $f_1$ and $f_2$ could also be maximized as well without departing from example embodiments of the invention. Additionally, the non-dominated solutions may be feasible due to the constrain minimization mechanism, as implemented by the constraint minimization engine 220.

Figure 5:
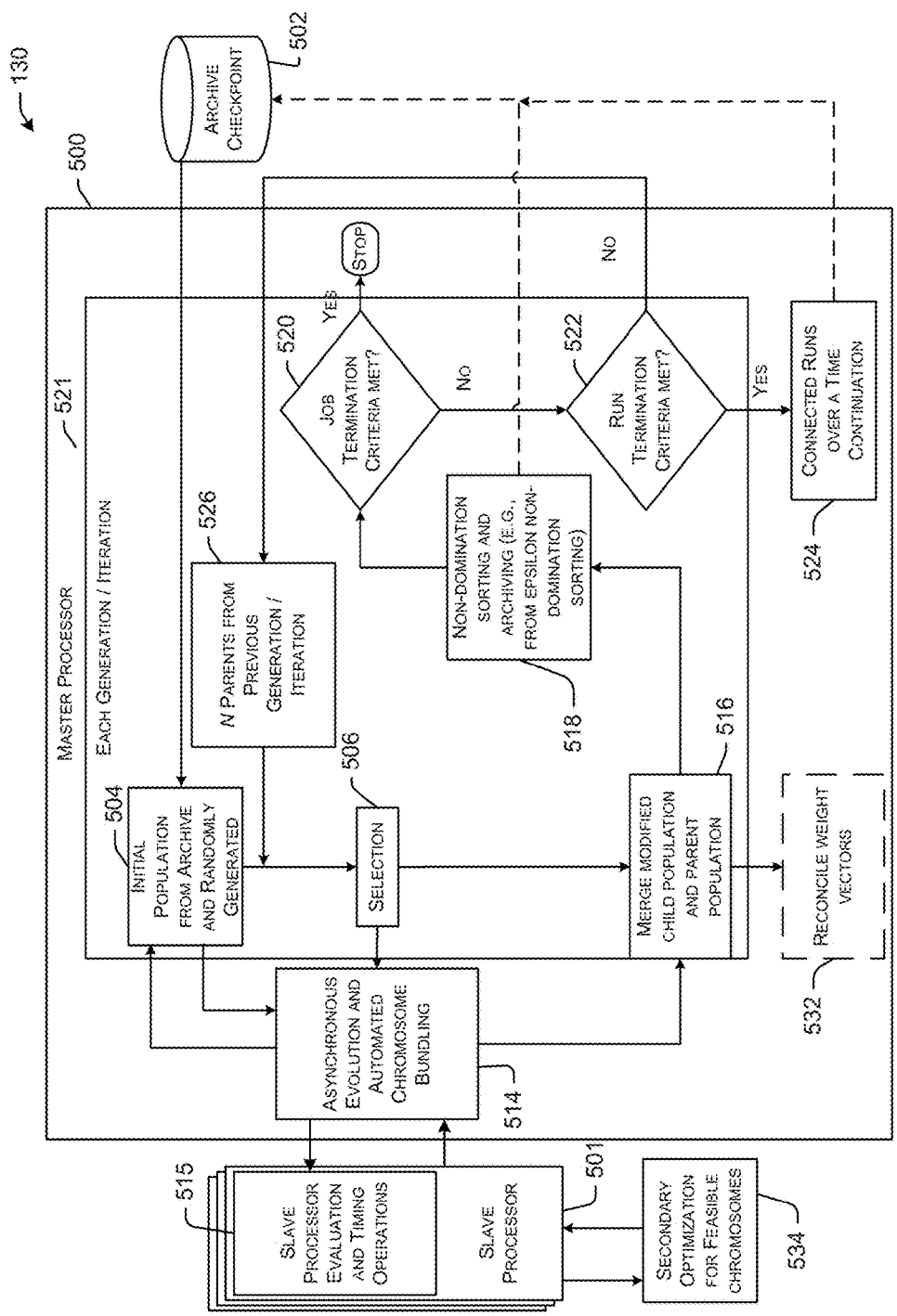
FIG. 5 is a block diagram that illustrates the example MOOA system of FIG. 1 with a secondary optimization for finding feasible chromosomes, in accordance with example embodiments of the disclosure.

FIG. 5 is a block diagram that illustrates the example MOOA system 130 of FIG. 1 with a secondary optimization 534 for finding feasible chromosomes, in accordance with example embodiments of the disclosure. The descriptions of elements 500, 501, 502, 504, 506, 516, 518, 520, 522, 524, and 526 may be substantially similar to the descriptions of elements 300, 301, 302, 304, 306, 316, 318, 320, 322, 324, and 326, and in the interest of brevity will not be repeated here.

At block 506 sets of parent chromosomes may be selected by the master processor 500 from the input population of parent chromosome data structures. In an example embodiment of the disclosure, the selection of the pairs of parent chromosome data structures may occur according to a tournament selection process, which may include a crowded tournament selection process. An example tournament selection process in accordance with an example embodiment of the disclosure may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the disclosure. The winners of each tournament become the two or more parents resulting from the selection process of block 506. It will be appreciated that a predetermined number of pairs of parent chromosome data structures may be selected in block 506. It will also be appreciated that a particular parent chromosome data structure may be present in two or more selected pairs of parent chromosome data structures, according to an example embodiment of the disclosure. In some cases, the number of parent chromosomes selected in each round or iteration may be dynamic.

After selection of sets of parent chromosomes, unlike in FIG. 3, the parent chromosomes may be sent to slave processors 501 for the generation of a child population. Thus the selected sets of parent chromosomes may be sent to the asynchronous evolution and automated chromosome bundling block 514, where the sets of parent chromosomes may be provided to slave processors that may generate and return feasible or at least relatively less constrained genes of the child chromosomes than what may be generated by just applying the genetic operators (e.g., cross-over, mutation, etc.). The sets of parent chromosomes, as selected at block 506, may then be sent to slave processors 501. In example embodiments, one set of parent chromosomes (e.g., a pair of parent chromosomes) may be sent to each slave processor 501 for evaluation and/or generation of child chromosome(s). At the slave processors 501, in addition to performing evaluation and timing operations 515, the slave processors 501 may return feasible child chromosomes and/or provide decision variable perturbation models (e.g., cascading models). This drive to feasible children may be performed as a secondary optimization for feasible chromosomes 534. The secondary optimization for feasible chromosomes 534, as performed at the slave processors 501, is described in greater detail in conjunction with FIG. 6. In example embodiments, the child chromosomes may be returned from the secondary optimization back to the master processor 500 along with objective values and constraint values of each of the child chromosomes.

The secondary optimization for feasible chromosomes 534 may return one or more feasible chromosomes that may be merged with parent chromosomes at block 516. The secondary optimization for feasible chromosomes 534 may also return a weight vector that may be utilized to perturb, such as in a cascading manner, genes of a chromosome to make the chromosome more feasible. In example embodiments, the returned weight vector may be reconciled and/or combined with other weight vectors received from other slave processors 501 by the master processor 500 for the purposes of perturbing chromosomes to achieve a greater level of feasibility. At block 532, the weight vectors may optionally be reconciled. In other words, the different weight vectors returned from each of the slave processors may be combined (e.g., averaged, weighted averaged, moving average, etc.) and made available to future iterations of the multi-objective optimization and/or future generations of the same optimization. In some cases, update weight vectors may be provided to the slave processors 501, such as at block 514, for the purposes of performing secondary optimization for feasible chromosomes 534 with a best known set of weight vectors.

Figure 6:
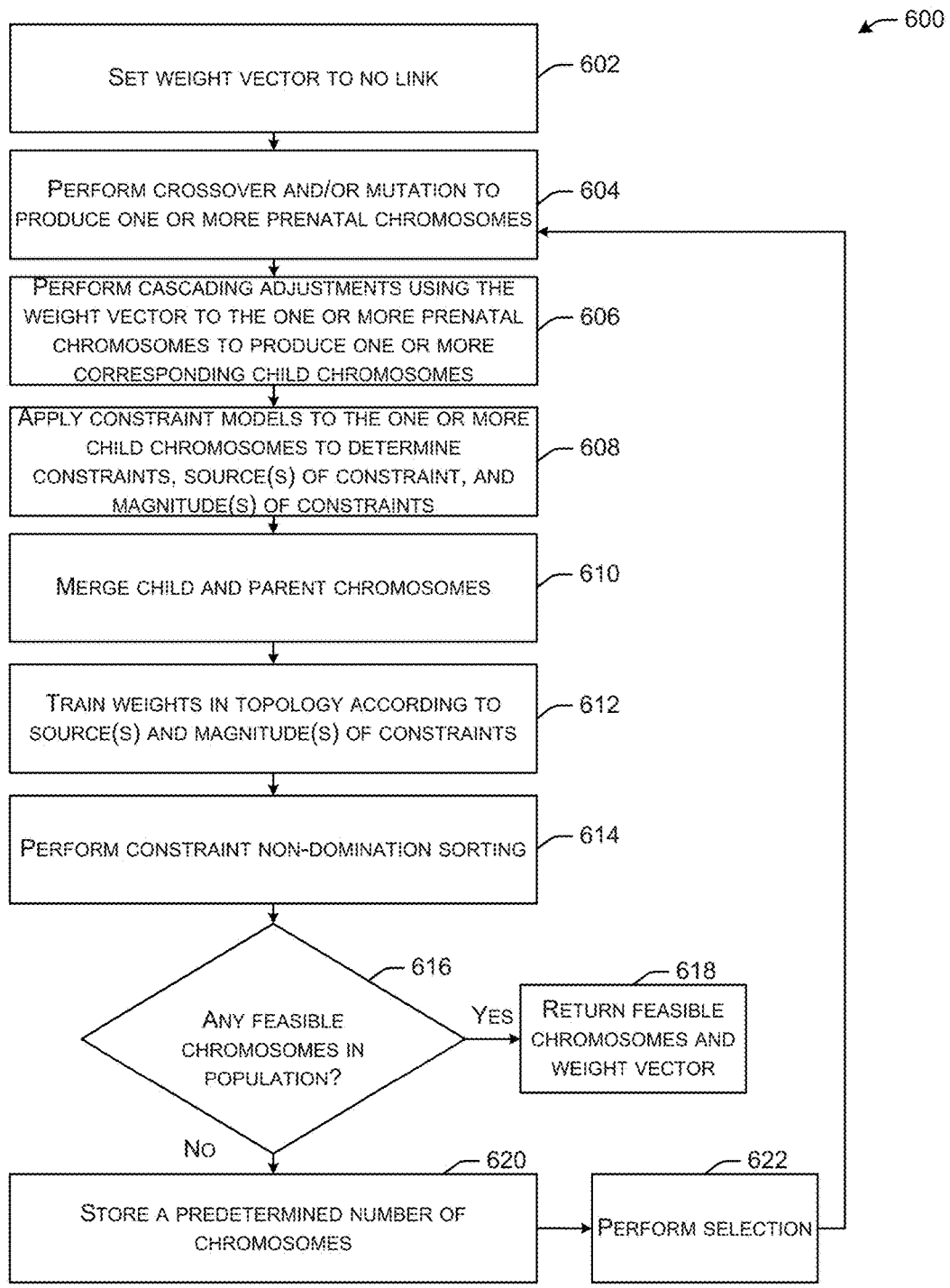
FIG. 6 is a flow diagram that illustrates an example method of generating a feasible chromosome in a secondary optimization process, in accordance with example embodiments of the disclosure.

FIG. 6 is a flow diagram that illustrates an example method 600 of generating a feasible chromosome in a secondary optimization process, in accordance with example embodiments of the disclosure. The method 600 may further generate a weight vector that may be applied to chromosomes to achieve a greater level of feasibility (e.g., reduced number and/or level of constraints). In example embodiments, the method 600 may be the process of performing secondary optimization for feasible chromosomes 534, as depicted in FIG. 5.

At block 602, a weight vector may be set to no link. In other words, there may be no perturbations that may be affected by applying this initial weight vector to a chromosome. In an alternate example embodiment, the initial weight vector may be received from the primary optimization master processor 500.

At block 604, cross-over may be performed to generate one or more prenatal chromosomes. This cross-over process may be performed using the parent chromosomes that were received by the slave processor 501 from the master processor 500, such as via block 514, as depicted in FIG. 5. The cross-over may be performed multiple times to generate a predetermined number of prenatal chromosomes (e.g., 100 prenatal chromosomes).

At block 606, cascading adjustments may be performed on the prenatal chromosomes using the weight vector to produce one or more child chromosomes. In the first iteration of method 600, the weight vector may be set to no linkages between genes, and therefore, the child chromosomes may be equivalent to the prenatal chromosomes. Alternatively, if the weight vector does start with an initial value, then the child chromosomes may be different from the prenatal chromosomes even in the first iteration of method 600. In these cases, the initial weight vector values may be based at least in part on a reconciled weight vector from previous feasibility optimizations, such as those performed on the same or other slave processors 301.

At block 608, constraint models may be applied to the one or more child chromosomes to determine constraints, sources of constraints, and magnitudes of the constraints. At block 610, the parent and the child chromosomes may be merged. Merging the parent and child chromosomes may entail storing all of the stored parent chromosomes from a previous generation along with the newly generated child chromosomes.

At block 612, weights may be trained according to the sources and magnitude of the constraints. As discussed above, the learning models may be any suitable model, including, but not limited to, neural networks, linear regression, Bayesian tree models, genetic algorithms, combinations thereof, or the like. In other example embodiments, the weights may be trained according to a merge set of child and parent chromosomes (e.g., training set) and information returned from constraint models (e.g., detailed interdependencies (linkages) between decision variables and localized constraint violations).

At block 614, constraint non-domination sorting may be performed. In this case, instead of non-domination sorting based upon objective values, the non-domination sorting may be based upon constraint values. The non-domination sorting may be performed on the merged set of child and parent chromosomes, as merged at block 610. The non-domination sorting may be used to identify an elite set of chromosome data structures based at least in part on the corresponding constraint function values. The metrics used for constraint based non-domination sorting may be any suitable combination of number of constraints, source of constraints, and/or magnitude of constraints. For example, the magnitude of each of the constraints of a particular chromosome may be summed and that cumulative constraint magnitude may be used for the purposes of non-domination sorting. In other examples, a total number of constraint violations may be used for the purposes of chromosome non-domination sorting. In yet other examples, an average of the magnitudes of the constraints may be used for the purposes of non-domination sorting. As in the case of objective values, in example embodiments, a constraint value epsilon space mechanism may be used for the purposes of non-domination sorting. A chromosome may be considered non-dominated compared to another chromosomes if that chromosome is no worse according to all constraint metrics (e.g., cumulative magnitude, average, total number, weighted average, etc.) and is strictly better according to at least one of the constraint metrics compared to the other chromosome.

At block 616, it may be determined if any feasible chromosomes may have been produced in the population. If it is determined that there has been at least one feasible solution generated in the population, then that/those feasible chromosomes, along with the weight vector, may be returned to the master processor 500 to continue multi-objective optimization.

If at block 616 it is determined that the population does not contain any feasible solutions, then at block 620, a predetermined number of chromosomes from the population may be stored. At block 622, another selection process may be performed. This selection process may be similar to the process of block 506 of FIG. 5. For example, any variety of tournament selection may be performed to identify parent chromosomes that will then be subject to cross-over and/or mutation operations at block 604. After the selection process, the method 600 may return to block 604 to generate a set of prenatal chromosomes from chromosomes selected at block 622. In this way, the method 600 may loop until a feasible solution is found and returned to the master processor 500.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
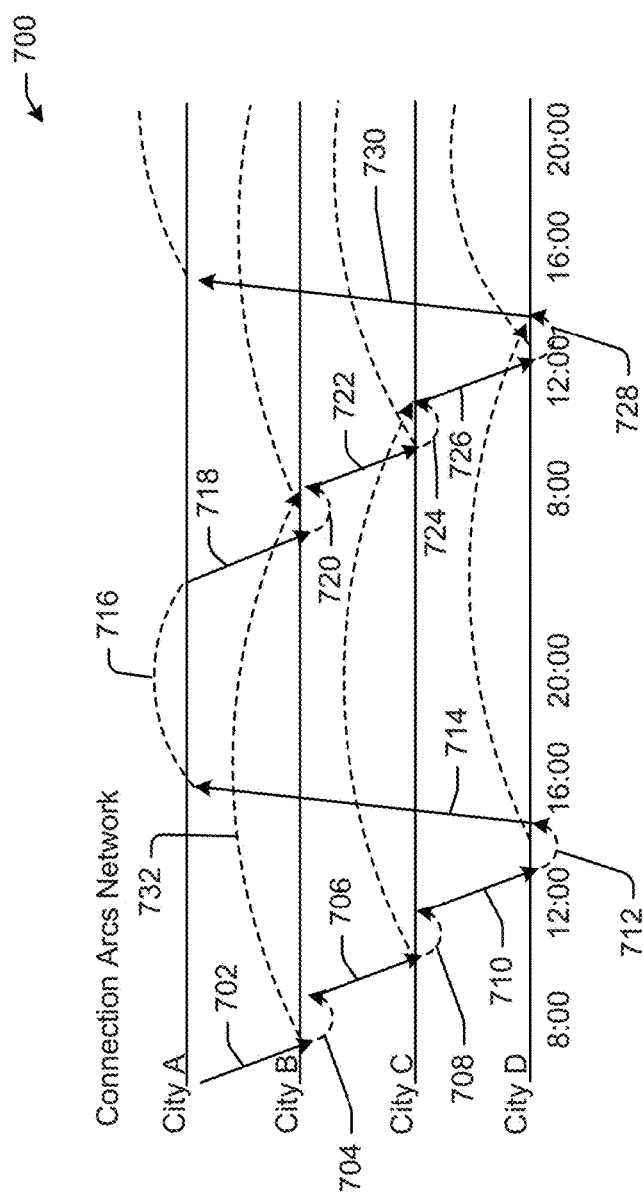
FIG. 7 is a schematic diagram that illustrates an example line of flight with linkages therebetween, in accordance with example embodiments of the disclosure.

FIG. 7 is a schematic diagram that illustrates an example line of flight 700 with linkages therebetween, in accordance with example embodiments of the disclosure. The line of flight may include three cities (City A, City B, City C, and City D) between which an aircraft is to fly. The flight legs are represented by the arrows 702, 706, 710, 714, 718, 722, 726, 730 between the cities. Additionally, there may be delay time (e.g., ground delay) between the arrival of an aircraft into a particular city and the departure of that aircraft from that city. These ground delays may represent time needed for taxiing, cleaning aircrafts, inspecting aircrafts, expected maintenance, preventive maintenance, refueling, combinations thereof, or the like. The ground delays may be represented by arcs 704, 708, 712, 716, 720, 724, 728, 732. Arc 716 may represent a ground delay that is longer than that of arc 712. The additional time associated with arc 716 relative to arc 712 may be for refueling. It will be appreciated that in some cases, the aircraft may not be able to depart on schedule. In these cases, the aircraft may be halted at a particular airport and there may be a longer delay at that airport so that the aircraft may redeploy to the next flight from that airport. For example, arc 732 may represent a delay if the aircraft is stuck in City B and is to be used next for flight leg 722.

Figure 8:
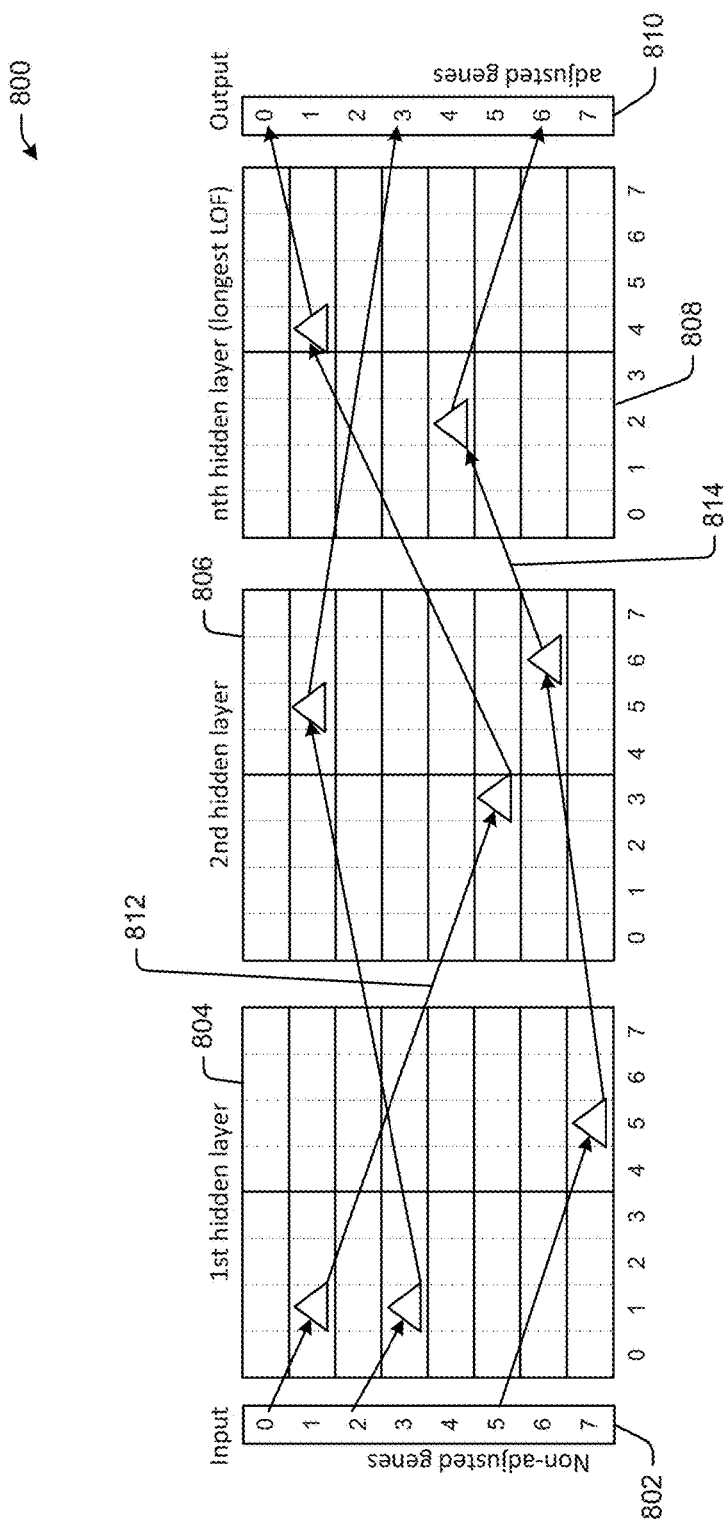
FIG. 8 is a schematic diagram that illustrates an example set of perturbation models for decision variables with inter-linkages, in accordance with example embodiments of the disclosure.

FIG. 8 is a schematic diagram that illustrates an example set of perturbation models 800 for decision variables with interlinkages, in accordance with example embodiments of the disclosure. This perturbation model may be similar to one that may be generated by a neural network with one or more hidden nodes 804, 806, 808. An initial set of unadjusted genes 802 may be provided and the genes may be modified in the first hidden layer 804, then the second hidden layer 806, and then the final hidden layer 808. The choice of three hidden nodes is for illustrative purposes only. It will be appreciated that there may be any suitable number of hidden layers. One or more of the genes may be subject to a perturbation from one hidden node 804, 806, 808 to the next 804, 806, and 808. Line 812 represents a transformation of gene 0 from the first hidden layer 804 to the second hidden layer 806. This transformation may be represented as one or more corresponding parameters in a weight vector. For example, the weight vector may have one or both of an offset and/or multiplicative constant that represents a perturbation from the first hidden layer 804 to the second hidden layer 806 for gene 0. Line 814 represents a transformation of gene 5 from the second hidden layer 806 to the nth hidden layer 808. In this way, the genes 802, organized as a chromosome, may be transformed via one or more transformations and/or modifications to generate adjusted genes 810. In example embodiments, unadjusted chromosome 802 may be infeasible and adjusted chromosome 810 may be feasible after the perturbations to the genes 802 in the hidden layers 804, 806, 808. Thus the perturbation models, such as a model having various perturbation weights of various genes, thus may be used to bring the chromosome to feasibility.

FIGS. 9A-D are schematic diagrams that illustrate example cascading perturbations 904, 934, 944, 950, 956, 958 974, 980 of a series of linked genes 902, 906, 926, 936, 942, 946, 948, 952, 956, 960, 972, 976, 978, 982 within a chromosome in response to a value setting of a particular gene, in accordance with example embodiments of the disclosure. The genes may represent a series of flights between airports A, B, and C of an aircraft. The constraints and the cascading perturbations may arise, for example, out of ground time of aircrafts before turning them around for a flight to a subsequent airport.

In FIG. 9A, an initial gene 902 may be mutated 904 to gene value 906. This mutation may result in a constraint violation, such as between new gene 906 and gene 926. There may be perturbing weights 912, 914, 916, 918, 920, 922, 924, such as forward weights 908 and/or reverse weights 910, which may be applied to perturb genes to bring the chromosome into feasibility, or at least reduced levels of constraints. When gene 902 is mutated to gene 906, weight 920 may be applied to perturb gene 926 in a forward direction, as shown in a future snapshot 930 FIG. 9B. In this case, gene 926 may be perturbed forward in time 934 due to the time of flight segment 932 being too short and resulting in a constraint violation. Thus, gene value 926 may now become gene value 936, based at least in part on weight 920. However, this perturbation form value 926 to value 936 may result in other genes having constraints, and as a result, a cascading set of additional perturbations may be implemented to reduce constraints resulting at other gene locations and/or values.

At a further in future snapshot 940 of the gene values of FIG. 9C, additional gene values may be perturbed to achieve greater levels of feasibility. The perturbation 934 of gene 926 may lead to perturbation 944 of gene 942 to new gene value 946. The perturbation 934 of gene 926 may also drive a perturbation 950 of gene 948 to new gene value 952. Both perturbations 944 and 950 may be forward perturbations performed to at least reduce the level (e.g., number, magnitude, etc.) of constraints. There may also be a reverse perturbation 954 from gene value 926 to gene value 956. Additionally, there may be another reverse perturbation 958 from gene value 906 to 960. Note that as in the case of the perturbation 958, the perturbations may, in example embodiments, modify a gene that may have originally been the source of the first constraint violation. In snapshot 970 of FIG. 9D, there may be further adjustments 974, 980 of gene value 972 to gene value 976, and gene value 978 to gene value 982. At the snapshot 970, the chromosome after the adjustments, according to a learned weight vector, may be feasible.

It will be appreciated that the systems and methods, as disclosed herein, may enable the optimization of problems that were not solvable by previous systems and methods due to relatively high levels of constraints resulting from decision variable interdependencies. Additionally, it will be appreciated that the systems and methods, as discussed herein, may reduce the level of needed resources (e.g., processing bandwidth, time, memory, etc.) for the purposes of performing multi-objective optimizations. Therefore, a relatively greater scope and complexity of multi-objective optimization problems may be solvable by deploying the systems and methods as discussed herein.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   determining, by one or more processors of a multi-objective heuristic system, a first chromosome and a second chromosome associated with a multi-objective optimization;
   generating, by the one or more processors, a third chromosome by performing a genetic operation on the first chromosome and the second chromosome;
   determining, by the one or more processors and based at least in part on one or more constraint models, that the third chromosome is infeasible, wherein the one or more constraint models provide an indication of a first gene of a constraint, a second gene that is a source of the constraints, and a magnitude of the constraint;
   perturbing, by the one or more processors and based at least in part on a decision variable perturbation model, at least one of the first gene or the second gene;
   perturbing, by the one or more processors and based at least in part on the perturbation of the one of the first gene and the second gene, the other of the first gene or the second gene to generate a perturbed third chromosome;
   determining, by the one or more processors, that the perturbed third chromosome is feasible; and
   providing, by the one or more processors, the perturbed third chromosome as a solution to the multi-objective optimization.

2. The method of claim 1, further comprising:
   ranking, by the one or more processors and according to one or more constraint metrics, the third chromosome against a set of chromosomes; and
   determining, by the one or more processors and based at least in part on the ranking, that the third chromosome is non-dominated.

3. The method of claim 1, wherein determining the first chromosome and the second chromosome associated with the multi-objective optimization further comprises performing a tournament selection process according to one or more objective values of the multi-objective optimization.

4. The method of claim 1, wherein generating the third chromosome by performing the genetic operation on the first chromosome and the second chromosome further comprises generating a prenatal chromosome and modifying the prenatal chromosome according to a weight vector to generate the third chromosome.

5. The method of claim 1, further comprising indicating, by at least one of the one or more processors to another of the one or more processor, that the third chromosome is feasible.

6. The method of claim 1, wherein providing the perturbed third chromosome as a solution to the multi-objective optimization comprises non-domination ranking of the perturbed third chromosome relative to a plurality of chromosomes according to a plurality of objectives.

7. The method of claim 1, wherein the perturbed third chromosome comprises a perturbed third gene, wherein a constraint depends on the value of the perturbed third gene and at least one of the first gene and the second gene.

8. The method of claim 1, further comprising revising the decision variable perturbation model based at least in part on the indication of the first gene, the second gene, and the magnitude of the constraint.

9. The method of claim 8, wherein the decision variable perturbation model comprises a weight vector having one or more weights corresponding to constraints resulting from one or more interdependencies between the first gene and the second gene.

10. The method of claim 8, wherein the decision variable perturbation model is further based at least in part on a plurality of weight vectors.

11. A system, comprising:
a memory that stores computer-executable instructions;
at least one processor configured to access the memory, wherein the at least one processor is further configured to execute the computer-executable instructions to:
determine a first chromosome and a second chromosome associated with a multi-objective optimization;
generate a third chromosome by performing a genetic operation on the first chromosome and the second chromosome;
determine, based at least in part on one or more constraint models, that the third chromosome is infeasible, wherein the one or more constraint models provide an indication of a first gene of a constraint, a second gene that is a source of the constraints, and a magnitude of the constraint;
perturb, based at least in part on a decision variable perturbation model, at least one of the first gene or the second gene;
perturb, by the one or more processors and based at least in part on the perturbation of the one of the first gene and the second gene, the other of the first gene or the second gene to generate a perturbed third chromosome;
determine that the perturbed third chromosome is feasible; and
provide the perturbed third chromosome as a solution to the multi-objective optimization.

12. The system of claim 11, wherein the at least one processor is further configured to execute the computer-executable instructions to:
rank, according to one or more constraint metrics, the third chromosome against a set of chromosomes; and
determine, based at least in part on the ranking, that the third chromosome is non-dominated.

13. The system of claim 11, wherein the at least one processor is configured to determine the first chromosome and the second chromosome associated with the multi-objective optimization further comprises the at least one processor is configured to execute the computer-executable instructions to perform a tournament selection process according to one or more objective values of the multi-objective optimization.

14. The system of claim 13, wherein the at least one processor is configured to generate the third chromosome by performing the genetic operation of the first chromosome and the second chromosome further comprises the at least one processor is configured to execute the computer-executable instructions to generate a prenatal chromosomes and modifying the prenatal chromosome according to a weight vector to generate the third chromosome.

15. The system of claim 11, wherein the at least one processor is further configured to execute the computer-executable instructions to indicate that the third chromosome is feasible.

16. The system of claim 11, wherein the at least one processor is configured to provide the perturbed third chromosome as a solution to the multi-objective optimization further comprises the at least one processor is configured to non-domination rank the perturbed third chromosome relative to a plurality of chromosomes according to a plurality of objectives.

17. The system of claim 11, wherein the first chromosome is at least one of: (i) at or about a local minima in an objective space of the optimization problem; (ii) at or about a local maxima in the objective space of the optimization problem; or (i) at or about a saddle point in the objective space of the optimization problem.

18. The system of claim 11, wherein the at least one processor is configured to further execute the computer-executable instructions to revise the decision variable perturbation model based at least in part on the indication of the first gene, the second gene, and the magnitude of the constraint.

19. The system of claim 18, wherein the decision variable perturbation model comprises a weight vector having one or more weights corresponding to constraints resulting from one or more interdependencies between the first gene and the second gene.

20. The system of claim 18, wherein the decision variable perturbation model is further based at least in part on a plurality of weight vectors.

* * * * *